PROBABILISTIC LOGIC CHARACTER RECOGNITION
Filed Dec. 22, 1961 4 Sheets-Sheet 1
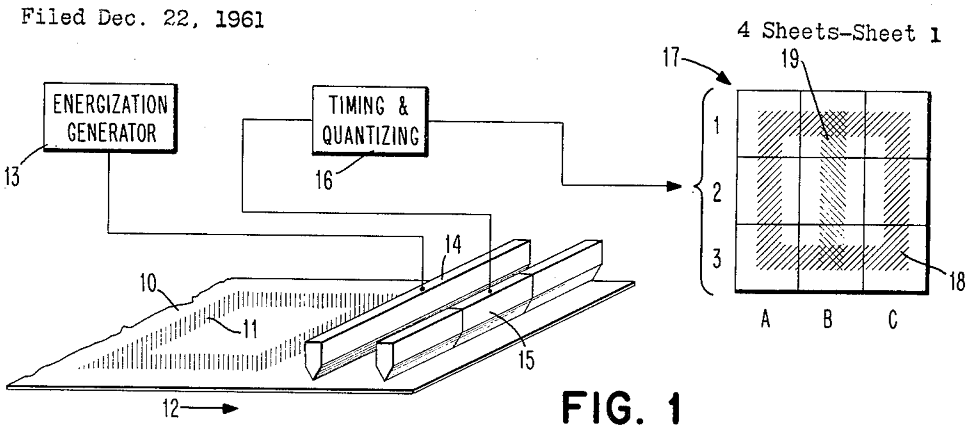
FIG. 1
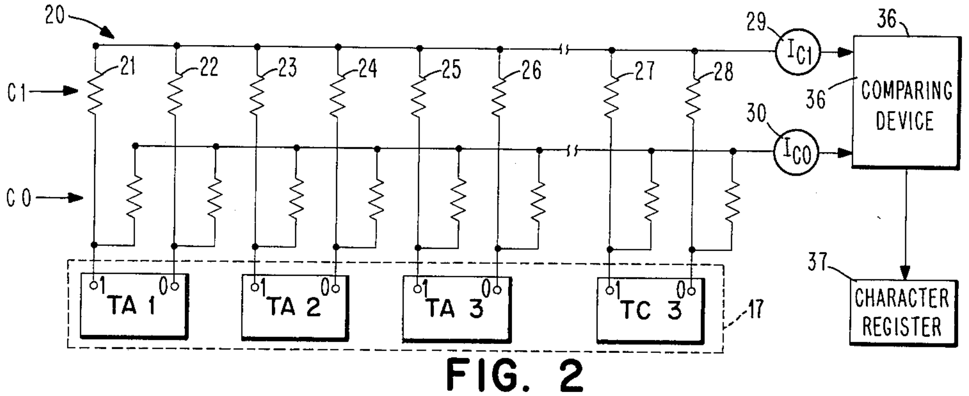
FIG. 2
31
| | COLUMN A | B | C |
|---|---|---|---|
| ROW 1 | .8 | .9 | .8 |
| ROW 2 | .9 | .1 | .9 |
| ROW 3 | .8 | .9 | .8 |
FIG. 3a
32
| | COLUMN A | B | C |
|---|---|---|---|
| ROW 1 | .1 | .8 | .1 |
| ROW 2 | .2 | .9 | .2 |
| ROW 3 | .1 | .8 | .1 |
FIG. 3b
33
| | COLUMN A | B | C |
|---|---|---|---|
| ROW 1 | 1 | 1 | 1 |
| ROW 2 | 1 | 0 | 1 |
| ROW 3 | 1 | 1 | 1 |
FIG. 3c
34
| | COLUMN A | B | C |
|---|---|---|---|
| ROW 1 | 0 | 1 | 0 |
| ROW 2 | 0 | 1 | 0 |
| ROW 3 | 0 | 1 | 0 |
FIG. 3d
35
| | COLUMN A | B | C |
|---|---|---|---|
| ROW 1 | 1 | 1 | 0 |
| ROW 2 | 1 | 1 | 0 |
| ROW 3 | 0 | 1 | 0 |
FIG. 3e
INVENTORS
ALLAN J. ATRUBIN
RICHARD C. LAMY
BY John C Black
ATTORNEY

PROBABILISTIC LOGIC CHARACTER RECOGNITION

Filed Dec. 22, 1961 4 Sheets-Sheet 2

PROBABILISTIC LOGIC CHARACTER RECOGNITION

Filed Dec. 22, 1961 4 Sheets-Sheet 3

United States Patent Office 3,233,219

Patented Feb. 1, 1966

3,233,219
PROBABILISTIC LOGIC CHARACTER RECOGNITION

Allan J. Atrubin, Cambridge, Mass., and Richard C. Lamy, San Jose, Calif., assignors to International Business Machines Corporation, New York, N.Y., a corporation of New York Filed Dec. 22, 1961, Ser. No. 161,608
20 Claims. (Cl. 340—146.3)

This invention relates to character recognition and more particularly to improved probabilistic recognition of a character scanned and represented by selective setting of memory elements in a two dimensional binary memory matrix.

Various types of character recognition apparatus have been proposed and among these is a type of apparatus providing for multichannel scanning of a character and the reproduction of the character scanned in a two dimensional matrix of binary elements.

Heretofore statements have been written setting forth conditions whereby a character scanned can be identified from the matrix representation thereof. These "statements" set forth predetermined conditions of a number of specific matrix elements which conditions may be said to exist only when a particular character has been scanned by the scanning apparatus. Each "statement" serves not only to identify a character, but to distinguish it from all other characters. Thus for each character to be recognized there must be provided a unique "statement" setting forth specific criteria in the form of conditions of the matrix elements required for the recognition of that character and for the discrimination of that character from all other characters.

One serious limitation involved in this type of system is that the absence of any of the criteria involved in a statement leads to either a misrecognition or a failure to recognize a character. The absence of a specific criteria can be caused, for example, by voids in the ink being printed, irregularities in printings, ink spatter or other dirt, electrical noise caused by contamination in the surface scanned or other noise arising in the recognition system.

This type of system also presents a problem in that the derivation of a set of statements for recognizing a set of characters can be extremely difficult.

It is the primary object of this invention to provide improved apparatus for recognizing a character represented in a binary matrix that is not dependent on an absolute set of conditions.

More specifically, the present invention relates to an improved probabilistic logic for recognizing a character represented by settings of a binary matrix based on the combined probabilities of each of various binary matrix conditions representing a given character.

It is a further object of the invention to provide an improved probabilistic logic utilizing the combined probabilities of both states of each binary matrix in the recognition of a character.

It is a further object of the invention to provide a network of resistances each inversely proportional to the logarithms of a probability value involved whereby the character most probably represented by a matrix pattern can be determined by current summing devices.

It is a further object of the invention to improve the probability values existing therein by the employment of partial statements and the probabilities of the partial statements existing when a given character is scanned.

It is a further object of the invention to provide probability representations by means of a unique and extremely simple probability resistance network.

It is a further object of the invention to provide a unique current differencing apparatus for determining which character is most probably represented by the output of the probability resistance network.

It is a further object of the invention to provide means embodying the probabilistic character recognition system in combination with matrix representations of a character which occupies unknown vertically oriented positions in the matrix and must therefore be vertically rolled through the matrix for recognition to be effected.

The foregoing and other objects, features and advantages of the invention will be apparent from the following more particular description of preferred embodiments of the invention, as illustrated in the accompanying drawings.

In the drawings:

FIG. 1 is a block diagram showing in elementary form essential component parts for scanning a character and setting up a binary matrix representation thereof.

FIG. 2 is a fragmentary showing of a probability resistance network conditioned by settings of the binary elements forming the matrix of FIG. 1 and serving to identify the character most probably represented thereby.

FIG. 3*a* is a representation of the binary matrix shown in FIG. 1 having, in the various matrix positions, numbers representative of the probabilities of a binary digit "1" in each position being produced by the scanning of a character 0.

FIG. 3*b* is a representation of the binary matrix shown in FIG. 1 having, in the various matrix positions, numbers representative of the probabilities of a binary digit "1" in each position being produced by the scanning of a character 1.

FIG. 3*c* is a representation of the binary matrix shown in FIG. 1 having, in the various matrix positions, numbers representative of a perfect matrix pattern for the character 0.

FIG. 3*d* is a representation of the binary matrix shown in FIG. 1 having, in the various matrix positions, numbers representative of a perfect matrix pattern for the character "1."

FIG. 3*e* is a representation of the binary matrix shown in FIG. 1 having, in the various matrix positions, numbers representative of a degraded matrix pattern for the character "1."

Figure 4:
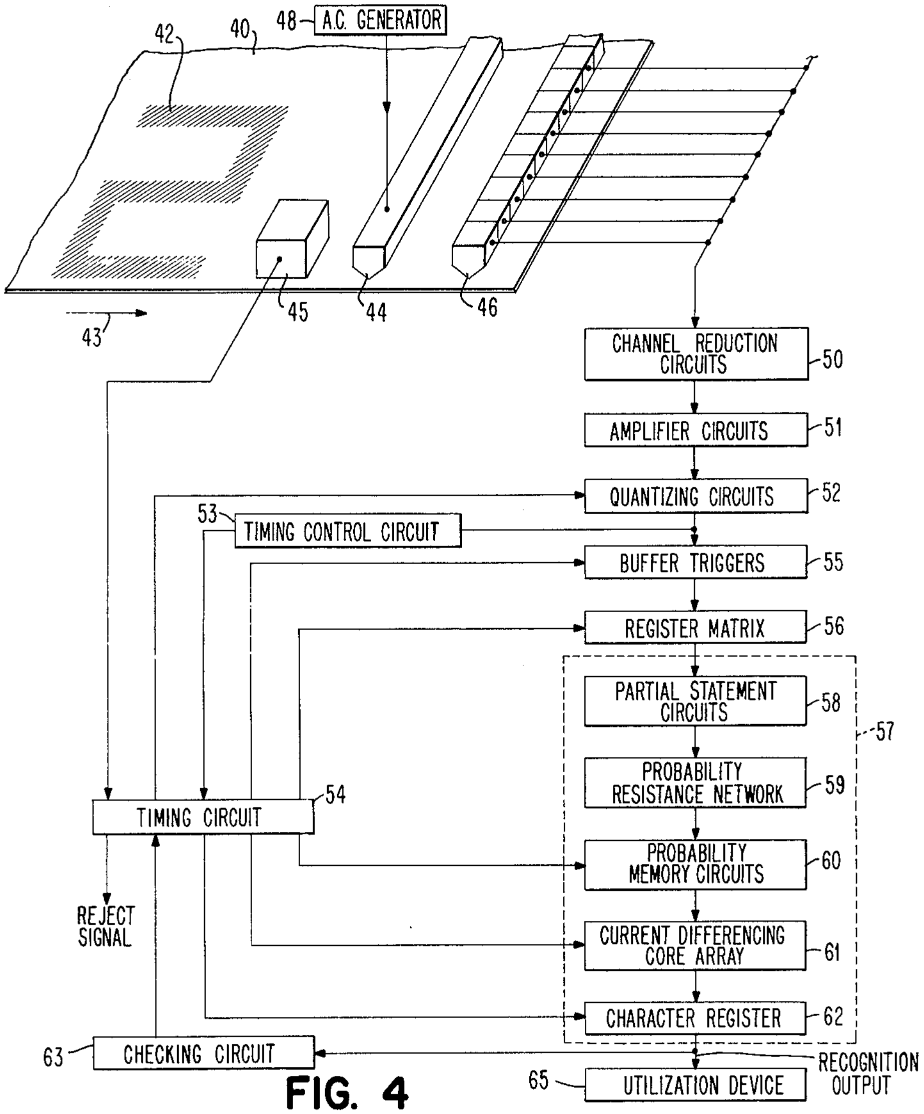

FIG. 4 is a block diagram showing the various component parts of a preferred embodiment of a character recognition system employing the invention disclosed herein.

Figure 5:
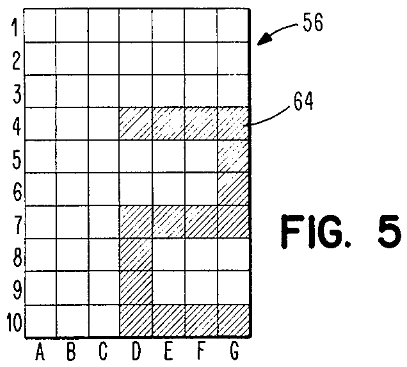

FIG. 5 is the representation of a character superimposed on a matrix representative of a binary register matrix indicated in FIG. 4.

Figure 6:
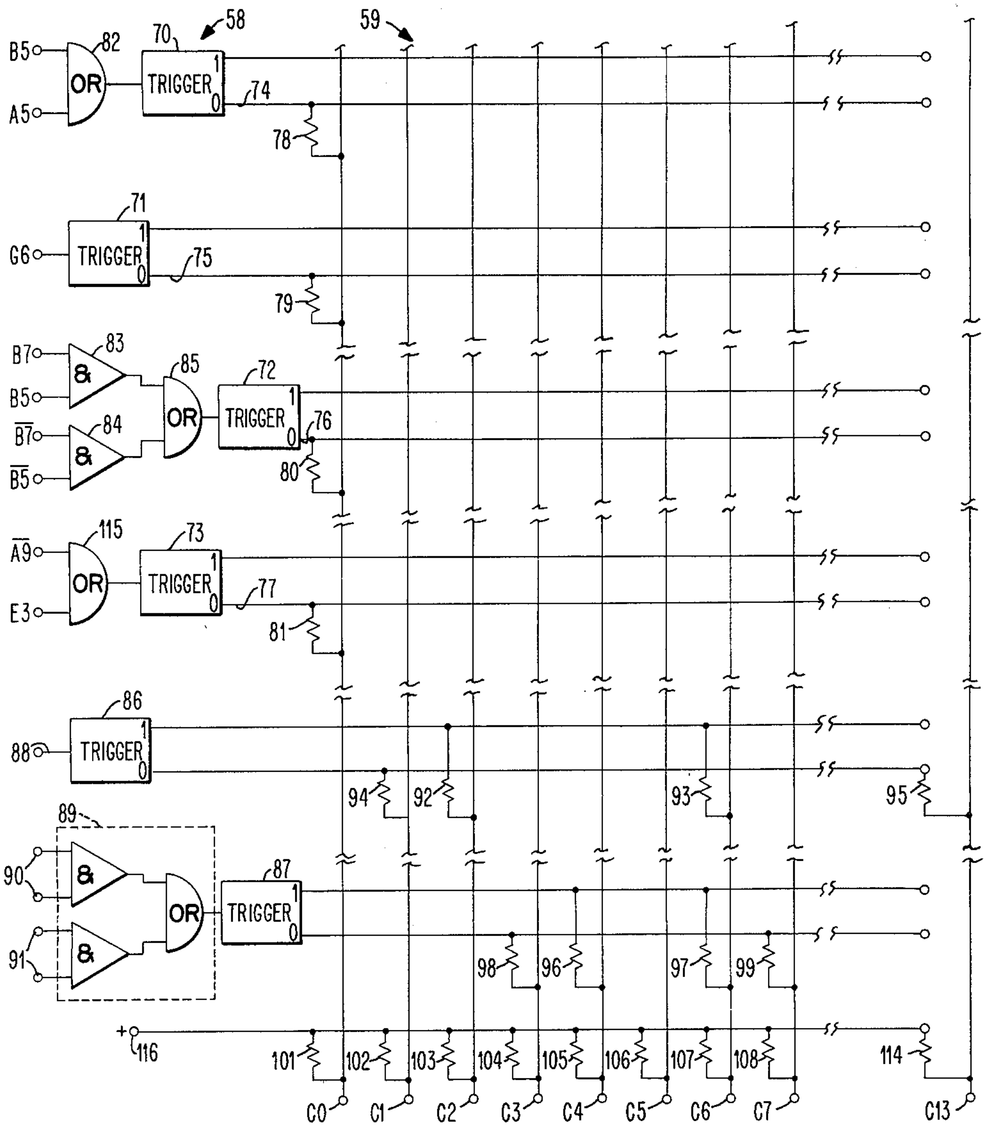

FIG. 6 is a fragmentary showing of circuitry representing a partial "statement" and the probability resistance network associated therewith in connection with the recognition of the character shown on the matrix in FIG. 5.

Figure 7:
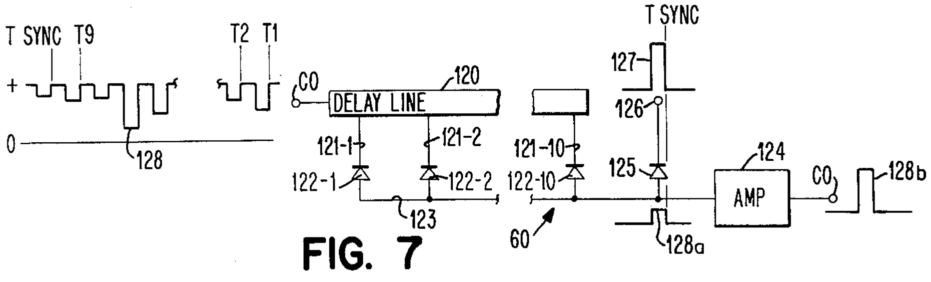

FIG. 7 is a circuit diagram of one channel of the probability memory circuits which receive the outputs of the probability resistance network of FIG. 6.

Figure 8:
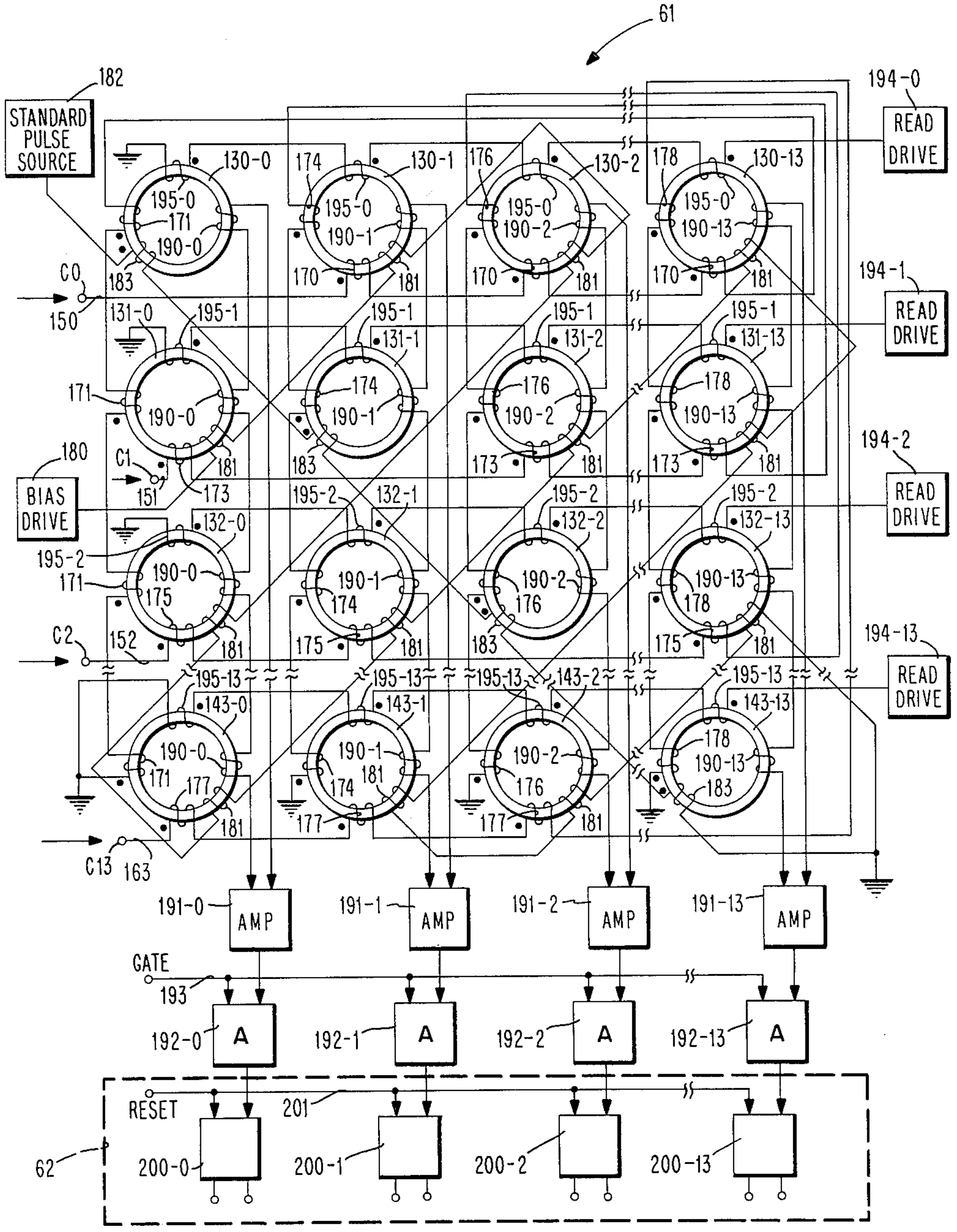

FIG. 8 is a circuit diagram of a current differencing core array receiving the outputs of the probability memory channels for each of the characters to be recognized.

The following disclosures will be divided into three sections as follows:

I. The theory of the system
II. A basic system embodying the basic invention
III. A detailed system embodying partial statements and providing for a row of characters in a matrix

I. THE THEORY OF THE SYSTEM

Character recognition requires the reliable determination of which one of a group of predetermined characters is represented by a complex signal derived from the scanning of a printed character. The problem is complicated by the fact that in any given printing equipment, each of the predetermined characters cannot be faithfully reproduced in a perfect form or for that matter in the same imperfect or degraded form for reasons set forth above. In addition, unavoidable noise is introduced in the scanning process.

As a result, whenever one of the predetermined characters is printed and scanned, the signal produced is one of a large class of possible detected signals. On the basis of the detected signal, an attempt is made to identify the predetermined character which was chosen for printing.

Because of the complexity of the noise and of the many printing impressions (or inputs) which may be formed when one of the predetermined characters is selected, the apparatus cannot be analyzed in detail, therefore its workings are studied by observations of its input (impressions)-output (derived signals) characteristics. Because of the non-repetitive nature of the noise in the scanning process, a given one of the inputs does not always result in a specific output. Many different outputs are possible for a particular input.

The input-output characteristics of the printing-scanning process are of a statistical nature. A common but not necessary property of such a process is the memoryless nature of the process, i.e., if characters are printed and scanned in time sequence, the impression degradation and noise added to successive characters are statistically independent.

The problems associated with attempting to identify the original character selected, knowing only the output signal and the process statistics, can be solved by the design of an "optimum system" which operates on the output signal in an attempt to identify the original character. An "optimum system" can only be designed after the optimizing criterion has been set. This amounts to weighing or evaluating all possible correct and incorrect identifications which the process may make.

The characters are generally printed in magnetic link or in an ink providing light contrast with a background material. During the detecting or sensing process, the characters are energized magnetically or optically and moved past a multitrack scanning means. The continuous output waveforms of the scanning means are quantized in both time and amplitude and the resulting signals are employed to set a two dimensional matrix of binary elements which then provides a representation of the character scanned.

The binary digital designation in each matrix position is a "1" or a "0" depending upon whether or not the distribution and density of the ink forming the character in the corresponding character area meet some predetermined criteria. The set of all possible receiver signals, then, is the set of all possible matrix patterns. This is $2^n$ signals where $n$ is equal to the number of matrix positions or elements.

The purpose of the system is to determine which of various possible input message characters has most probably formed the input to the system resulting in any given output matrix pattern, and whether this probability is of sufficiently high order to justify signalling the recognition of that character.

One possible probabilistic logic decision device would be a device including means for recognizing the existence of any one of all possible matrix patterns and means for signalling the character represented by each pattern or for signalling reject when a pattern indeterminative of any given character is presented. This requires the determination of accurate probabilities for all possible matrix patterns involved, i.e., $2^n$ power matrix patterns where $n$ equals the number of matrix positions. Obviously this system is impractical because of the vast amount of information which must be obtained and the elaborate circuitry which would be involved in recognizing the matrix patterns and providing the necessary decisions.

Another possible probabilistic logic decision device would include a probability matrix for each character to be recognized and, under a governing set of rules, determine the best pattern-character fit. For example, the data necessary for a statistical catalog of characters are obtained by analyzing a large sample of each character, each of which has been properly aligned in a viewing field and resolving each into a matrix of smaller elements. The elements are assigned a "mark" or "1" status if occupied by a black portion of the character and a "no mark" or "0" status if the element is unoccupied. After many samples of a particular character have been analyzed, the probability of a mark falling in each resolution area is determined. For example, if 100 samples of the number 1 are analyzed and if in 80 of the cases a particular element in the matrix is marked, then this element is assigned a probability of .80. In this fashion, a probability matrix for each character is constructed.

The pattern to be recognized is subsequently compared with each of these matrices under a governing set of rules and the best pattern-character fit is determined. If the measure of pattern-character fit is based solely on the largest value of cross-correlation function computed as the input pattern is compared with each stored matrix, recognition may be unreliable since one pattern may have the same cross-correlation function when compared to several different characters, only one of which is the true character. Thus, discriminability between cross-correlation functions computed for similar characters is low.

In a search for a practical system, we have discovered that it is possible to store in a device a set of probabilities and an improved economically feasible set of computational rules which can be used to generate approximately the pertinent probabilities for any given matrix upon the receipt of that matrix.

Statistical decision theory gives the following. For a given binary matrix $M_k$, consider for all characters to be recognized (e.g. 14) $P(C_i/M_k)$, the probability that the $i$th character $C_i$ was originally selected, given that the $k$th matrix $M_k$ was received: where $M_k$ is fixed and C ranges over all 14 characters. Consider $$\left[\max_i P(C_i M_k)\right]$$

the largest of the $P(C_i/M_k)$.

If $$\text{If}\left[\max_i P(C_i/M_k)\right]>a$$

then identify $M_k$ with the $C_i$ giving this largest probability.

If $$\text{If}\left[\max_i P(C_i/M_k)\right]\leq a$$

then reject the matrix $M_k$. This is called maximum likelihood detection, and this is the first decision which the character recognition system must make. This decision criterion minimizes the error rate for a fixed reject rate or equivalently minimizes the reject rate for a fixed error rate. For this given optimizing criterion no better identifying system can be devised. Here "$a$" is some constant (normally, very nearly unitl). As "$a$" varies ($0\leqslant a\leqslant 1$) the reject rate varies but the error rate is always at its minimum possible value for any reject rate in the range. For $a=0$, the reject rate is zero and the error rate has some value. The reject rate is a nondecreasing function of $a$. The error rate is a nonincreasing function of $a$. The error rate vanished for $a=1$, that is when all matrices are rejected.

Denote the probability, for the $i$th character $C_i$, that the matrix binary digit in the $r$th and the $c$th column of the matrix is black, or the probability that the matrix digit $d_{rc}$ is a 1, given that the character $C_i$ is originally chosen by $$P[(d_{rc}=1)/C_i]$$

The probability that $d_{rc}$ is a 0 given that the character $C_i$ is originally chosen is $$P[(d_{rc}=0)/C_i]=1-P[(d_{rc}=1)/C_i]$$

Consider a binary matrix $M_k$ at the channel output. $M_k$ consists of a number of binary digits $d_{rc}^k$ (each either 1 or 0). Given that the character $C_i$ is selected, the probability that the digit $d_{rc}$ is $d_{rc}^k$ is $$P[(d_{rc}=d_{rc}^k)/C_i]=d_{rc}^k P[d_{rc}=1)/C_i] + (1-d_{rc}^k)P[(d_{rc}=0)/C_i]$$

A critical approximation is made at this point and that is that for a given character, the binary digits in the various matrix positions are statistically independent. The validity of this approximation has been borne out by experience. This statistical independence implies that the probability of the occurrence of the matrix $M_k$ can be computed by multiplying the probabilities of occurrence of the individual digits in the matrix, i.e.

$$P(M_k/C_i)=\pi_{r,c}P[(d_{rc}=d_{rc}^k)/C_i]$$

From these probabilities the pertinent probabilities can be computed as follows:

$$P(C_i/M_k)=\frac{P(C_i)}{P(M_k)}\cdot P(M_k/C_i)$$

A particular case of interest is that in which $P(C_i)$, the a priori probability of selection of a character $C_i$ is a constant independent of $_i$. In the example being discussed this means that $P(C_i)=1/14$. When $P(C_i)$ is constant $$P(C_i/M_k)=\frac{P(M_k/C_i)}{\sum_i P(M_k/C_i)}$$

This simplified case will be discussed. Assume a system involving an 8 x 10 matrix and 14 characters to be identified. The probabilistic logic decision device must store only the numbers $P[(d_{rc}=1)/C_i]$ for all $r$, $c$, and $i$; (that is, $10\times 8\times 14=1120$ probabilities). The device performs the appropriate multiplications to generate the 14 numbers $P(M_k/C_i)$ for a particular matrix $M_k$. These 14 probabilities must be summed and the appropriate divisions performed to generate each of the numbers $P(C_i/M_k)$. The largest of these must be compared with "$a$," noted above, to determine if the matrix is to be identified or rejected.

Computations based upon real-life data indicate that the sum $$\sum_i P(M_k/C_i)$$

may be very closely approximated by the sum of the two largest terms only, that $$\sum_i P(M_k/C_i)=\left[\max_i P(M_k/C_i\right]+\left[2\max_i . P(M_k/C_i)\right]$$

where the operators $$\max_i$$

and $$2\max_i$$

indicate the operation of selecting the largest and second largest, respectively, of the numbers $P(M_k/C_i)$ for fixed $k$, and $i$ ranging over all 14 values. When this approximation is made it can be shown that the decision criterion can be expressed as follows:

If $$\frac{\left[2\max_i P(M_k/C_i)\right]}{\left[\max_i P(M_k/C_i)\right]}<b$$

then identify $M_k$ with the $C_i$ which gives $$\left[\max_i P(M_k/C_i)\right]$$

If $$\frac{\left[2\max_i P(M_k/C_i)\right]}{\left[\max_i P(M_k/C_i)\right]}\geq b$$

then reject the matrix $M_k$. Here "$b$" is given very nearly by $$b=\frac{1-a}{a}$$

and for "$a$" very nearly unity (the usual case) $b$ is very nearly $(1-a)$.

Thus, the decision device need only perform the appropriate multiplications to generate the numbers $P(M_k/C_i)$ and inspect the ratio of the second largest to the largest. This is again the first decision to be made by the character recognition system but in different form from that identified above as $$\left[\max_i P(C_i/M_k)\right]>a$$

The first problem is to generate the function $$P(M_k/C_i)=r,\ \pi c P[(d_{rc}=d_{rc}^k)/C_i]$$

For each character $C_i$ and for each matrix position $(r, c)$ the two probabilities $P[(d_{rc}=1)/C_i]$ and $$P[d_{rc}=0)/C_i]$$

are stored in the matrix binary elements. For a given input matrix $M_k$, the matrix binary digits $d_{rc}^k$ are used to switch the appropriate probabilities into the multipliers to form the various character functions $P(M_k/C_i)$, one each $C_i$.

In terms of analogue circuitry, multiplication is difficult to perform. However, the multiplication problem can be avoided by generating not $P(M_k/C_i)$ but log $P(M_k/C_i)$ where $$\log P(M_k/C_i)=\sum_{rc}\log P[(d_{rc}=d_{rc}^k)/C_i]$$

Thus, the problem of multiplication of probabilities is replaced by one of addition of logarithm. To accomplish this addition, a resistance network can be provided employing for each matrix location and for each character to be recognized a resistance value inversely proportional to the logarithm of the appropriate probability, i.e., the probability for each character that the particular matrix location binary element will be indicating either "black" or "white," in binary digit "1" or "0." If a constant potential is applied across each of these resistances and the currents through the resistances for each of the characters is summed and passed through suitable current detectors, these summation currents will represent sums of the logarithm for each of the characters. Specifically, $$R^i_{r,c,d}\alpha\frac{-1}{\log P[(d_{rc}=d)/C_i]}$$

where $R^i$=resistance for $i$th character in $r$th row, $c$th column for "black" or "white" digit $d$, and where $d=0$ or 1; then:

$$I_i \alpha - \log P(M_k/C_i)$$

Note that probabilities are numbers lying between 0 and 1 inclusive. Their logarithms then range from $\infty$ to 0.

A practical range for the probabilities $(d_{rc}=d)/C_i$ can be set from about .01 to .99. This implies a set of resistors varying over a 500 to 1 range and, similarly, a maximum to minimum current ratio in the current detectors of 500 to 1. On the scale that the minimum current is 1 and the maximum is 500, a typical value for the critical current difference by which the second smallest must exceed the smallest is about 40.

From these currents representative of the respective probabilities of each of the probable characters being represented by a matrix pattern, character recognition or reject is effected.

The decision to identify a character is made in accordance with the following:

(1) Selection of the current summation character line have the minimum current.

(2) Determination of sufficient difference between the value of current in the minimum current character line and in the next minimum current character line to indicate sufficiently high probability of the most probable character. This is the first decision described above which the system must make.

(3) Determination that the value of the current in the minimum current character line is sufficiently low to indicate sufficiently high probability to warrant a recognition. This is a second decision to be made by the character recognition system.

The character recognition system so far described identifies an unknown scanned character with that one of the group of possible characters which it most nearly resembles, providing that the unknown is sufficiently closer to this character than to any other, i.e., the first decision to be made by the apparatus, $$\frac{{}_2\max_i P(M_k/C_i)}{\max_i P(M_k/C_i)} < b$$

Sufficient closeness is determined in the design by the expected perturbations on the character and by the desired relationship between reject and error rates. The performance of the system, using only the first decision, will be good if the noise or perturbation which deteriorates the signals is small relative to the actual difference between the signals from perfect characters. For example, in a given character font the 3 and 8 characters may be more alike than any other pair of characters. Assuming a perfect matrix 3 is read into the register matrix, the probability signals on the 3 and 8 lines will differ by some absolute value. If the noise in the system is low relative to this value only the first decision need be made for reliable recognition. As the average amount of noise increases, the performance is degraded. When the average amount of noise becomes large with respect to the difference between character signals, then over-all performance will probably not be satisfactory. This does not however preclude the possibility of handling occasional signals perturbated by large amounts of noise, for example as may be encountered by occasional smears caused by erasures. The first decision will not handle frequently recurring large level noise well since large perturbations will swamp the distinction between characters we would otherwise have preserved in the face of smaller perturbations.

However, such large perturbations either transform the character into a pattern looking not much like any character or transform a character into a pattern looking like some other particular character. In the latter case, there is nothing to be done and an error will occur. For example, if a printed 3 is so degraded that it looks like an 8, it will be recognized as an 8 in any recognition apparatus used. In the former, which is more usual, errors can be avoided by insisting that an unknown pattern will be identified only if it sufficiently resembles a standard character. Hence we introduce the second criterion which must be met for identification:

$$\max_i P(M_k/C_i) > e$$

or $$\log \max_i P(M_k/C_i) > \log e$$

This places an upper bound on the allowable minimum current. This bound is proportional to log $e$. The design of individual systems now involves the selection of two parameters, $a$ (described above with respect to the first decision) and $e$. For a given pair of values of $a$ and $e$, the system probabilities determines what will be the reject rate and the error rate. Thus reject and error rates can be tabulated for different pairs of values of $a$ and $e$ and the system design completed by selecting that pair which optimizes the system performance. Optimization may take the form of evaluating a cost function of the reject and error rates.

However, any optimizing criterion is easily executed because the functional relationship between the reject and error rates and the parameters $a$ and $e$ exists in tabular form.

This discussion has glossed over the straightforward but very lengthy task of measuring the pertinent system probabilities and calculating from these the reject and error rates for given parameters $a$ and $e$.

From the foregoing, it will be evident that current detectors in each of the character current summation lines will serve to indicate the character current of smallest amplitude which represents the character of maximum probability. The degree of difference between the smallest current and the next smallest curent is an approximation to the probability of the most likely character.

The foregoing discussions do not consider the problems which exist when the characters are variously positioned in the register matrix as actually occurs in practical character recognition apparatus. Additional problems are caused by variations in resolution in the scanning means, the quantizing means and the timing means producing variations in the apparent size, i.e., height and width, of the character represented in the binary matrix. Furthermore, various expedients may be employed for simplifying the probability resistance network. These considerations are accommodated by the completely developed system which will be described in connection with the embodiment of FIG. 4.

Before proceeding with a description of the detailed system, a basic system will be described embodying the basic theoretical considerations as set forth above.

II. THE BASIC SYSTEM

In FIG. 1, there is shown at 10 a fragmentary portion of a document or other surface forming means carrying indicia 11. In this example, the indicia is shown in the form of a numeric character 0. The character is printed by means of magnetic ink and is adapted to be sensed by magnetic scanning means.

The document 10 is advanced in the direction of the arrow 12 by any conventional means and the character 11 is carried past magnetic write and read heads 14 and 15, respectively, positioned to scan the character as it passes thereby.

The write head is powered from a suitable source 13 and the output of the read head, which is actually a plurality of heads positioned one adjacent to another to provide multichannel scanning of characters passing thereunder, is delivered to suitable timing and quantizing means 16.

In this example the multichannel read head 15 is a three channel head and three separate quantizing circuits are provided. In this example the timing means provides three character time increments during which quantizing is effected. The outputs from the three quantizing circuits for the three successive time increments are delivered to successive columns of a matrix of nine binary elements indicated generally at 17 as a 3 x 3 matrix having rows identified by numerals 1, 2 and 3, and columns identified by Letters A, B and C.

This example is maintained in its simplest form and hence the 3 x 3 matrix will be hereinafter described in conjunction with a system capable of reading the character 0 and the character 1. These two characters are represented at 18 and 19 respectively superimposed on the matrix. The quantizing and timing circuits function so as to set the binary matrix element in position A1 to a "1" or "black" condition upon the scanning of a character 0 and to set this element in a "0" or "white" condition upon the scanning of a character 1. These respective settings of the various other matrix elements will become evident upon examination of FIG. 1 and will be more fully described hereinafter in connection with FIGS. 3*a*–3*e*.

However, in accordance with the foregoing theoretical discussion, there is a predetermined probability that a 1 condition in the matrix position A1 is indicative of a character 0 and there is a predetermined probability that a 1 condition in the matrix position A1 is indicative of a character 1. As previously discussed, the inverse of the logarithm of these probabilities may be represented as resistance values and a resistance network may be provided to accommodate all of the various probabilities associated with each position in the matrix.

Such a resistance matrix is indicated generally at 20 in FIG. 2. If the matrix of FIG. 1 is assumed to be in the form of a plurality of triggers, these triggers may be represented by blocks TA1, TA2, TA3 . . . TC3, as shown in FIG. 2 and the "1" and "0" digit outputs of each of these triggers may be connected to the resistances representative of the character probabilities. In FIG. 2, tion line is an indication of the relative probability that the character indicated by the matrix is character C1.

There is indicated generally by the arrow C0 a row of resistances having values representing the probabilities of the various triggers being in a "1" or "0" condition on the scanning of a character 0. The summation of the currents $I_{C0}$ through these resistances is indicated by a current indicating device 30. It will be evident that if additional characters are to be recognized, the probability values of the various matrix triggers can be established and an additional row of resistances provided to produce a summation current representative of the probability of any matrix pattern representing that character. Indications of the total current in each circuit are given by indicating devices 29 and 30, and as previously described the lowest indication will be indicative of the character scanned. This will become evident from the following discussion of the examples set forth in FIGS. 3*a*–3*e* and Chart 1.

In FIG. 3*a*, there is indicated at 31, a representation of the binary matrix 17 shown in FIG. 1 with a probability number in each matrix position indicative of the probability of a digit 1 existing in each matrix position representing a character 0. In FIG. 3*b*, there is indicated at 32 the matrix representation of the matrix 17 having in each matrix position a probability number representative of the probability of a 1 appearing each matrix position representing a character 1. For simplicity of illustration, the probabilities range from .1 to .9 in increments of .1, whereas in a more sophisticated system probabilities preferably range from .01 to .99 in increments of .01, or .001 to .999 in increments of .001 etc. The perfect character C0 matrix is indicated at 33 in FIG. 3*c* and the perfect character C1 matrix is indicated at 34 in FIG. 3*d*. In FIG. 3*e*, there is indicated at 35, a degraded character matrix C*d*.

Chart No. 1 below sets forth examples of actual resistance values employed in a resistance network such as shown in FIG. 2 to represent the probabilities indicated in FIGS. 3*a* and 3*b* and there follows examples of actual numeric summations showing the results obtained upon the occurrence of matrix patterns such as shown in FIGS. 3*c*, 3*d* and 3*e*.

*Chart No. 1*

| Matrix Position | | P (drc=1)/C0 | | | P (drc=0)/C0 | | | P (drc=1)/C1 | | | P (drc=0)/C1 | | |
|---|---|---|---|---|---|---|---|---|---|---|---|---|---|
| Col. | Row | P | R | I | P | R | I | P | R | I | P | R | I |
| A | 1 | .8 | 10.3 | .097 | .2 | 1.4 | .699 | .1 | 1.0 | 1.0 | .9 | 21.7 | .046 |
| A | 2 | .9 | 21.7 | .046 | .1 | 1.0 | 1.0 | .2 | 1.4 | .699 | .8 | 10.3 | .097 |
| A | 3 | .8 | 10.3 | .097 | .2 | 1.4 | .699 | .1 | 1.0 | 1.0 | .9 | 21.7 | .046 |
| B | 1 | .9 | 21.7 | .046 | .1 | 1.0 | 1.0 | .8 | 10.3 | .097 | .2 | 1.4 | .699 |
| B | 2 | .1 | 1.0 | 1.0 | .9 | 21.7 | .046 | .9 | 21.7 | .046 | .1 | 1.0 | 1.0 |
| B | 3 | .9 | 21.7 | .046 | .1 | 1.0 | 1.0 | .8 | 10.3 | .097 | .2 | 1.4 | .699 |
| C | 1 | .8 | 10.3 | .097 | .2 | 1.4 | .699 | .1 | 1.0 | 1.0 | .9 | 21.7 | .046 |
| C | 2 | .9 | 21.7 | .046 | .1 | 1.0 | 1.0 | .2 | 1.4 | .699 | .8 | 10.3 | .097 |
| C | 3 | .8 | 10.3 | .097 | .2 | 1.4 | .699 | .1 | 1.0 | 1.0 | .9 | 21.7 | .046 |

Probability P: P [drc/C]

Resistance R: $Rr_ic_id\alpha\frac{-1}{\log_{10}P[drc/C]}$

Current I: $I\alpha -\log P(M_k/C)$
Where drc="0" or "1" and
When C=C1 or C0.

the resistances 21, 23, 25 . . . 27 are connected to the on or digit 1 side outputs of triggers TA1, TA2, TA3 . . . TC3, respectively, forming the 3 x 3 matrix of FIG. 1. Resistances 22, 24, 26 and 28 are connected to the 0 or off side outputs of these triggers, respectively. This row of resistances, as indicated generally by the arrow C1, have values selected to represent the probability of the respective triggers being in their 1 or 0 states upon the scanning of a character 1. Thus the summation of the currents $I_{C1}$ through these various resistances taken at a current indicating device 29 in the current summa- The first column of the chart identifies matrix positions by column and row, thus the matrix trigger in Column 1, row A, is A1, and the trigger in the Column 3, row C, is C3. This is the same notation employed in connection with the triggers in FIG. 2.

Column 2 of the chart indicates the probability value P, the resistance value R, and the resulting current value I, involved in connection with the probability of a given trigger showing a trigger condition "1" for the character 0. It is assumed that the voltage applied to the "1" and "0" outputs of each trigger is either 0 or 1 volt depending upon the state of the trigger. Column 3 indicates the probability value P, resistance value R, and resulting current value I, involved for any trigger in a digit position 0 representing the character 0. Column 4 shows these values for trigger conditions 1 indicating character 1 and column 5 indicates these values for trigger conditions 0 indicating character 1.

The following examples set forth the actual current conditions $I_{C1}$ and $I_{C0}$ through the current indicating devices 29 and 30 for the perfect character C0 matrix shown in FIG. 3*c*, the perfect character C1 matrix shown in FIG. 3*d* and the degraded character C*d* matrix shown in FIG. 3*e* using the current values from Chart 1. It will be noted that the perfect character matrices provide current summations of substantially different values and the lowest value is of course indicative of the character represented by the matrix as explained above. In Example 3, the degraded character of FIG. 3*e*, which upon inspection of FIG. 3*e* will clearly evidence a character 1 more nearly than it evidences a character 0, provides current summations in which the C1 current is substantially less than a C0 current and accordingly indicates that the far greater probability is that the matrix pattern represents a character 1 than that it represents a character 0.

EXAMPLE 1.—PERFECT CHARACTER C0, MATRIX OF FIG. 3c $I_{C0}$=.097+.046+.097
+.046+.046+.046
+.097+.046+.097=0.618
$I_{C1}$=1.0+.699+1.0
+.097+1.0+.097
+1.0+.699+1.0=5.582 Difference=4.964

EXAMPLE 2.—PERFECT CHARACTER C1, MATRIX OF FIG. 3d $I_{C0}$=.699+1.0+.699
+.046+1.0+.046
+.699+1.0+.699=5.898
$I_{C1}$=.046+.097+.046
+.097+.046+.097
+.046+.097+.046=0.618 Difference=5.280

EXAMPLE 3.—DEGRADED CHARACTER C0, MATRIX OF FIG. 3e $I_{C0}$=.097+.046+.699
+.046+1.0+.046
+.699+1.0+.699=4.332
$I_{C1}$=1.0+.699+.046
+.097+.046+.097
+.046+.097+.046=2.174 Difference=2.158

The means for comparing the currents $I_{CO}$ and $I_{C1}$ set forth in the above examples is shown diagrammatically in FIG. 2 wherein a comparing device 36 is connected to each of the summing lines $I_{C1}$ and $I_{C0}$. The comparing device 36 may comprise any of the known devices for comparing the amplitudes of a pair of currents and for comparing the value of the smallest of said currents with a predetermined standard current. A preferred comparing device is that which will be described with respect to the embodiment of FIG. 4.

If the comparing device determines that one of the two currents in $I_{C1}$ or $I_{C0}$ is sufficiently smaller than the other of the two currents and if it determines that the smallest current is lower than the standard current, it will cause a character register 37 connected to the output of the comparing device to indicate the recognition of the character corresponding to the summing line which is carrying the smallest current. In the event that one or both of these conditions are not satisfied, the comparing device will cause the character register to indicate nonrecognition of the scanned character. The character register 37 may comprise a bistable trigger for each character and preferably is similar to the register which will be described in detail with respect to the embodiment of FIG. 4.

The foregoing represents a complete operative though elementary system involving the invention. For the recognition of more complex characters and for greater numbers of characters, a more sophisticated system will be preferred. Furthermore, as noted under the theoretical discussion above, the characters represented by the matrix are not always perfectly centered in the matrix, due to resolution problems they do not always appear in the matrix in identical heights and widths and due to printing tolerances as well as resolution problems, they do not always appear in the matrix with identical line widths. In order to accommodate these and other problems, a more sophisticated embodiment of the invention is provided.

Before describing the more sophisticated embodiment of the invention, it should be noted that several modifications and simplifications may be made to the resistance network of FIG. 2.

A first means for reducing the number of resistances in the matrix involves the concept that the lowest value resistances are primarily determinative of the total current flow in the character current summation lines. For each pair of resistances connected to the 1 and 0 outputs of each trigger and delivering current to the same summation line, such as resistances 21 and 22 of FIG. 2, the larger of the two resistances may be removed; and for each character summation line a single resistance having a value equivalent to the parallel value of all of the larger resistances removed from that circuit can be provided. Then each of the smaller resistances is increased by a value which will decrease its current contribution by an amount equal to the value of the current which would have been provided by the removed resistor. It will be evident that this expedient will reduce, by a factor of nearly two, the total number of resistances employed; yet the current delivered to the summation lines for any matrix condition will not be altered.

This concept will be more readily apparent by a consideration of the current summing line connected to the indicating device 29. Particular reference is directed to columns 4 and 5 of Chart 1 and to the resistance and current values listed thereunder for the matrix triggers TA1–TC3 inclusive. The two columns 4 and 5 represent the resistances connected to the 1 and 0 outputs of each of the triggers. It will be seen that, for the matrix trigger B2 the resistance in column 4 is 21.7 ohms and it contributes .046 amp. to the summation line C1 and that for the same trigger TB2 the resistance in column 5 is 1.0 ohm and contributes 1.0 amp. to the current summation line C1.

The 21.7 ohm resistor is removed, and the 1.0 ohm resistor is increased to a value which will contribute .954 ampere rather than its original 1.0 ampere to the summation line C1. This requires an increase in the value of the 1.0 ohm resistor to 1.06 ohms. Similarly, the 21.7 ohm resistors in column 5 connected respectively to the 0 outputs of the triggers TA1, TA3, TC1 and TC3 are removed from the circuit and the 1.0 ohm resistors connected to the 1 outputs of the same triggers are each increased to a value of 1.06 ohms to provide an output current of .954 ampere. Now the five 21.7 ohm resistors removed from the current summation line C1 are replaced by a single resistor (not shown) which has a value corresponding to the parallel value of the five 21.7 ohm resistors which have been removed, i.e. 4.55 ohms.

When any one of these triggers is in a condition such that it would be energizing the large resistor, the .046 ampere current which would have been so provided by the large resistor is now supplied by the fixed continuously conducting resistor. In the event that the trigger is in the opposite condition where the large resistor would not have been conducting, the reduced current flow of .954 ampere in the smaller resistance plus the .046 fixed current portion of the substituted resistor provide the desired 1.0 ampere current flow.

A second modification reducing the number of resistances in the matrix can be made when it is considered that only those probabilities in selected ranges very close to 1 and 0 in a more sophisticated system contribute reliably to the recognition of the character. Under these conditions, only the highest and lowest value resistances corresponding to the probability ranges identified above are included in the network and intermediate order probability resistances representative of matrix locations of lower order consequence may be omitted.

For example, in the Chart 1 set forth it can be seen that the current contribution to a particular summation line provided by a resistor having a value of 1 ohm is in the order of ten times greater than the current provided to that summation line by a resistance having a value of 10.3 ohms. Thus, in the over-all current supplied to a summation line, the 10.3 ohm resistor is of little consequence. The difference in current contribution for the 1.0 ohm and 1.4 ohm resistors does not appear to be so great as to be neglected in the simplified embodiment, Chart 1. However, in a more sophisticated system having probability ranges with increments of .01, .001 etc., the differences in current extend over wider ranges of 500 to 1, 7500 to 1, etc., as compared with the 20 to 1 range of Chart 1. In such a sophisticated system, those resistances which contribute less significant values of current, e.g. 25 units or less in a 500 to 1 range, may be neglected or removed in the interest of economy.

The two foregoing modifications and additional modifications in the basic system will now be described in conjunction with the completely developed system shown in FIGS. 4–8.

III. A DETAILED SYSTEM

The detailed system is shown in block diagram in FIG. 4. The invention is described in connection with FIG. 4 as an improvement over a portion of the system disclosed in the patent application of Eckelman, Hennis and Larson, Serial No. 804,996, filed April 8, 1959, now Patent No. 3,165,717 dated January 12, 1965; and said application is specifically incorporated herein by reference as if it were set forth in its entirety.

In FIG. 4 there is shown at 40 a fragmentary portion of a document or other surface forming means carrying indicia 42. The indicia shown is in the form of a numeric character "2." The character is printed by means of magnetic ink and is adapted to be sensed by magnetic scanning means.

The document 40 is advanced in the direction of the arrow 43 by any conventional means and the character 42 is carried past magnetic write and read heads 44 and 46, respectively, positioned to scan the character as it passes thereby. The write head 44 is powered from an A.C. source 48.

The read head 46 is actually a plurality of read heads positioned adjacent to one another to provide multichannel scanning of characters passing thereunder. It is desirable to provide write and read heads of sufficient length with respect to the vertical height of the character to be read to insure scanning of the entire height of each character even though successive groups of characters may be displaced vertically with respect to each other or printed on various horizontal lines. Accordingly, a single extended write head is used and, in conjunction therewith, a read head is employed having in the arrangement described a number of heads which is an even multiple of the minimum number of heads desirably employed to fully scan a single character. Outputs from the multichannel read head 46 are delivered to channel reduction circuits 50.

In this embodiment of the invention, the channel reduction circuits preferably receive outputs from twenty magnetic heads in the read head 46 and reduce these to ten channels for subsequent manipulation. The ten channels represent a sufficient length of the read head 26 to insure the multichannel scanning of the entire height of a character 22. The length of the twenty read heads, for example, may be somewhat greater than twice the maximum character height to assure complete scanning of the character. The outputs of the upper ten heads are ORed with corresponding heads in the lower ten in the channel reduction circuits.

As will be evident to one skilled in the art, various types of scanning means may be employed. For example, optical scanning means may be employed to produce output signals substantially identical to those obtained by the magnetic scanning means shown in the drawing. The essential objective is the production of signals on ten channels representing horizontal scanning through a character to be recognized. It will also be evident that the selection of ten channels is arbitrary depending upon the configuration of the characters to be identified as well as the total number of characters to be recognized.

As shown in FIG. 4, each of the ten channels forming the output from the channel reduction circuits 50, is delivered to an amplifier circuit 51, serving to amplify the signal received. The amplified signals are delivered to digitalizing or quantizing circuits 52. These circuits serve to indicate when their respective read heads 16 are scanning character forming areas. When outputs are produced in two or more of the channels of the quantizing circuits 52, a timing control circuit 53 responsive to these outputs initiates operation of a timing circuit 54. The timing circuit 54 establishes character increment time intervals and controls delivery of quantizing circuit outputs during each of these time increments to respective buffer triggers 55, one in each of the ten channels.

Under control of the timing circuit 54, the buffer trigger settings are transferred during the successive character time increments to successive columns in a binary register matrix 56. In FIG. 5 there is indicated at 56, a representation of such a matrix which may, for example, be composed of trigger elements arranged in rows and columns with the rows indicated at 1–10 and the columns indicated at A–G. The timing circuit 54 provides eight successive time increments during the scanning of a character and during the first seven increments controls the transfer of quantizing circuit output signals through the buffer triggers to the successive columns G–A in the register matrix. It will be noted that the order of delivery to the matrix is right to left which is the order of scanning of the character 42 in FIG. 4 in accordance with the direction of travel of the document 40 and the digit carried thereby as indicated by the arrow 43.

The apparatus thus far described has been fully set forth in the above noted patent application and need not be recited in detail herein. For the purpose of the present invention, other known apparatus may be employed for scanning a character and providing, with suitable reliability, a matrix representation of the character scanned. It will also be evident that while the invention as hereinafter described is described in conjunction with a 7x10 matrix, matrices of various numbers of columns and rows of storage elements may be employed providing the probability values and other elements in the apparatus are selected accordingly.

The present invention is embodied in the apparatus contained within the outline 57 in FIG. 4 and includes the following components.

At 58 there is indicated partial statement circuits. These circuits are responsive to conditions of the register matrix after the scanning of a character. The circuits are provided to accommodate for nonindependence of some of the digits in the register matrix resulting from printing tolerances and resolution of the apparatus providing the character representation in the matrix.

For example, referring to the matrix indicated at 56 in FIG. 5, if the shaded area 64 therein represents the ideal matrix representation of a scanned character 2 and the leading edge of the character is aligned with the right-hand edge of the matrix and lower edge of the character is aligned with the bottom of the matrix, the printing tolerances and variations due to resolution could position the trailing edge of the character alternatively in column D or column C or in both columns and position the top edge of the character alternatively in row 4 or row 3 or in both rows. Typical partial statements more fully illustrating the concept involved will be hereinafter described in connection with Chart No. 2.

At 59 in FIG. 4, there is indicated a probability resistance network receiving outputs from the partial statements. This network, which will be hereinafter described in greater detail in connection with FIG. 6, involves the concepts previously described in connection with the network shown in FIG. 2 but represents a substantial simplification of the network of FIG. 2 adapted to a much more complex system.

At 60 there is indicated a probability memory. This memory is employed to remember probability resistance network outputs during "roll" of character vertically in the matrix 56 of FIG. 5 which is required due to the fact that character representations appearing therein are not necessarily centered in the matrix when originally established therein. This circuit, which will be hereinafter described in greater detail in connection with FIG. 7, selects the most probable recognition accuracy during any of the roll conditions.

At 61 in FIG. 4, there is indicated a current differencing core array by which the most probable output from the probability memory circuits is determined. This core array will be described in greater detail hereinafter in connection with FIG. 8.

At 62, FIG. 4, there is indicated a character register which is in the form of a number of binary storage elements equal to the number of characters to be recognized and connected to the current differencing core array whereby the character register corresponding to the most probable character is set to identify the character recognized. This character register will be described in greater detail in connection with FIG. 8.

The quantizing circuits 52, the buffer triggers 55 and the matrix register 56, and also the current differencing core array 60, the probability memory 61 and the character registers 62 are under the control of the timing circuit 54. While the basic timing circuit has been fully described in the above-noted patent application in connection with the functioning of the quantizing digitalizing circuits, the buffer triggers and the register matrix described therein, details of the timing circuitry as are necessary for the functioning of the current differencing core array, the probability memory and the character register described herein will be described hereinafter.

The output of the character registers may be connected to any known utilization device 65 and is also delivered to a checking circuit 63 for checking that the character and only one character has been identified by the apparatus. In the event of failure to identify a character or in the event of erroneous operation in which more than one character is indicated as being identified, the checking circuit 63 provides an output which may be employed to signal improper operation and may be employed to control the timing circuit to arrest operation of the apparatus as described in the abovesaid application.

There is also provided as indicated at 45 in FIG. 4, means for sensing the leading edge of a character bearing surface such as a card, sheet or other document forming means. The document sensing means 45 serves to provide an output pulse in response to the leading edge of a document and this pulse is employed to insure proper settings of various components of the timing circuit as described in the abovesaid application.

As previously noted, there is indicated generally at 56 in FIG. 5, a representation of the register matrix in the form of a 7 x 10 matrix of binary elements and as the character "2" shown in FIG. 4 is scanned, the circuitry described in connection with FIG. 4 will produce settings of the individual matrix elements providing a representation of the character 2 as indicated at 64 in FIG. 5. It will be evident that the representation shown in FIG. 5 is an idealized and perfect representation and in actual practice such perfect representations are seldom obtained.

The character 2 is shown in FIG. 5 as being aligned with the lower and right-hand edges of the matrix. The operation of the timing circuit 54 generally produces alignment of the character with the right-hand side of the matrix, because, as will appear below, the operation of the timing circuit 54 will be initiated by the scanning of two bits from the leading edge of each character, and because it controls the transfer of these two bits from the buffer triggers 55 to column G of the register matrix 56.

The details of the timing circuit 54 and its control of the quantizing circuits, the buffer triggers and the register matrix in time relationship with the scanning of the leading edge of a character are described in detail in the above-said Eckelman et al. application. This relative timing will be described briefly.

It is assumed that for any commercial installation employing the teachings of the present invention that the recognition apparatus is necessarily designed to work with a predetermined set of characters, or character font, inasmuch as each character font will have its own set of probabilities. The font is formed or stylized to provide maximum difference in appearance between characters and to provide minimum likelihood of a character presenting similar matrices in different rolled positions in the register matrix, for example the character 1 is not rectangular. Also, stylized characters are preferably used wherein the leading edge of each character assures the introduction of at least two black or 1 digits into the quantizing circuits so that the resulting two outputs of the quantizing circuits will initiate the operation of the timing control circuit 53 and the consequent initiation of operation of the timing circuit 54.

The stylized characters may have line widths formed of one or more increments .013 inch in width, and the character may be advanced past the read head at a rate such that the line increments pass the read head within 65 microsecond intervals. If a 30 kc. energizing signal is employed, there will occur two cycles of the 30 kc. signal during the passage of each line increment width. Thus one black area width of the character line increment will be characterized by a two cycle signal and a black area width of two character line increments will be represented by a four cycle signal. Each of these signals in each of the ten output channels of the channel reduction circuit 50 are applied in parallel to the ten channel amplifier circuit 51 for amplification and application to the quantizing circuits 52. The quantizing circuits 52 include a full wave rectifier, a clipper and shaper circuit, a delay smoother circuit, and an integration circuit (not shown) for each channel.

In each channel, the rectifier rectifies the signals from the amplifier output, and the clipper and shaper circuit clips the rectified waves at predetermined upper and lower levels to eliminate low level noise and to change the rectified information pulses to square waves of uniform amplitude. The clipped and shaped rectified wave is delivered to a delay smoother circuit 26 which delays and reverses the polarity of clipper and shaper output signals. These delayed pulses are then combined by means of an OR circuit with the clipped and shaped waves to produce a combination wave which is characterized by a substantially negative-going signal for each black bit interval. This particular combination wave will also contain relatively short time duration high level noise signals and this combination wave is fed to an integration circuit, the time constant of which eliminates the high level noise pulses but retains the information pulses. The output of the integration circuits are then applied to the buffer triggers in digital form with a one bit time interval delay between the incoming scanned bits and the setting of the buffer triggers by the scanned bits. The buffer triggers are then controlled by the timing circuit 54 to transfer 1 or black bits into each of the desired matrix positions of the register matrix 56.

The information bits corresponding to the scanned character is now set in the register matrix 56, ready for readout into the recognition circuits illustrated at 57 in FIG. 4. The leading edge of the scanned character has been properly positioned in the right-hand column G of the register matrix 56; however, as indicated above, there is no assurance that the character is vertically aligned in the register matrix whereby a roll operation is necessary in the recognition process.

The timing circuit 54 initiates the readout of the 0 and 1 bits from the register matrix 56 into the partial statement circuits 58 and thereafter rolls the bits in the register matrix one position vertically as described in the Eckelman application. The readout and roll functions will be repeated until the bits have been read out from each of the 10 positions they can assume in the matrix.

The timing circuit also controls in timed sequence the storage of the recognition probabilities in the probability memory circuits for each of the roll positions of the character in the register matrix. After the character has been rolled through all possible vertical positions in the matrix, the timing control circuit will initiate the readout of the maximum recognition probability in each channel from the probability memory circuits into the current differencing core array for the recognition of the character scanned. The timing circuit will control the transfer of the output of the current differencing core array into the character register and the operation of the checking circuit 63 to determine whether or not the scanned character is properly recognized. These functions of the timing circuit 54 will appear in more detail with respect to the description of FIGS. 6–8.

The circuits set forth within the outline 57 of FIG. 4 will now be described in detail. FIG. 6 illustrates diagrammatically certain of the partial statement circuits 58 and the associated probability resistance network. The following chart is a complete list of partial statements for identification of a scanned character with the numeral 0. The method used to derive this set of statements will be described below:

*Chart No. 2*

| | | | |
|---|---|---|---|
| $B5+A5$ | $C9+\overline{F7}$ | $G3+\overline{F2}$ | $B7+A7$ |
| $G6$ | $\overline{B9}+A4$ | $C9+C8$ | $A6+\overline{F5}$ |
| $G5$ | $G7$ | $\overline{E4}+\overline{C2}$ | $\overline{B10}$ |
| $\overline{E6}$ | $\overline{C7}$ | $\overline{E10}$ | $\overline{B7}+B4$ |
| $E9$ | $\overline{A9}+D3$ | $\overline{F5}+A5$ | $A7A5+\overline{A7A5}$ |
| $\overline{E5}$ | $A8+\overline{F6}$ | $F3+\overline{C3}$ | $\overline{F6}+F4$ |
| $\overline{E7}$ | $\overline{E4}+\overline{B2}$ | $F9+C9$ | $F4+\overline{C4}$ |
| $G4$ | $B7B5+\overline{B7B5}$ | $B6+A5$ | $F3+\overline{D3}$ |
| $D9$ | $\overline{D5}$ | $\overline{C4}+\overline{G3}$ | $\overline{A9}+E3$ |
| $\overline{G9}+C9$ | $A7+B6$ | $B7B6+\overline{B7B6}$ | |
| $\overline{C5}$ | $\overline{D7}$ | $\overline{G10}$ | |
| $\overline{F10}$ | $F6F5+\overline{F6F5}$ | $F4+\overline{E4}$ | |
| $F9+F8$ | $C9+\overline{F4}$ | $A6A5+\overline{A6A5}$ | |
| $\overline{D6}$ | $\overline{F6}+A5$ | $A7+\overline{F6}$ | |
| $B6+A6$ | $\overline{F7}+F3$ | $\overline{A9}+C3$ | |
| $\overline{C6}$ | $\overline{A9}+A4$ | $F9+D8$ | |

It will be recalled from the detailed description of the simplified embodiment of FIGS. 1–3 that the resistance network includes a current summation line for each character and that resistances inversely proportional to the logarithms of the appropriate probabilities are connected between the current summation lines and the outputs of the various matrix triggers. It will be remembered further that it was possible to omit the intermediate value resistors because they were of little significance in the determination of the recognition of a character. Also, the large value resistors corresponding to probabilities very close to 0 in each summation line were replaced by a constantly conducting equivalent resistance and the values of their complementary low value resistances were altered accordingly. Hence, only the low value resistors corresponding to probabilities very close to 1 remain connected between the current summation lines and the input triggers.

It was suggested in the theoretical discussion that the resistance values corresponding to probabilities from .99 to 1 and from 0 to .01, .999 to 1 and 0 to .001, etc. could be utilized in the design of a more sophisticated system. It has been found further, however, that even greater reliability is obtained by utilizing partial statement circuits 58 in a manner which will now be described in detail.

A character font comprising 14 stylized characters was used as a reference point. Each of these characters were printed a large number of times, in the order of 10,000 each. Each of these printed characters was scanned by appropriate equipment similar to that described above, and the resulting 7 x 10 matrix patterns, properly aligned in a register matrix, were recorded on magnetic tape. The approximately 10,000 matrix patterns for the first character C0 were then fed into a moputer and the computer was programmed to check each matrix position for the occurrence of a 0 (white) or 1 (black) condition. As seen in Chart No. 2 above which shows the results obtained from the scanning of the 10,000 matrices for the first character C0, i.e. the numeral 0, certain of the matrix positions were found to exist each and every time without fail in all 10,000 matrices. Thus the matrix binary bits G6, G5, E9, G4, D9 and G7 were found to be in the 1 (black) condition every time; and the binary bits in the matrix positions E6, E5, E7, C5, F10, D6, C7, D5, D7, E10, G10 and B10 were always found to be in the 0 (white) condition illustrated in Chart 2 by the Boolean bar, i.e., NOT 1 symbol. It is clear, therefore, that these particular matrix position bits have very pertinent probability values in recognizing a scanned character as the numeral 0; and, although it cannot be said that the occurrence probability value is 1, it is extremely close to 1 and the nonoccurrence probability for the character 0 is close to 0. However, it can be assumed that these matrix position bits, or partial statements, have sufficiently pertinent probabilities in the recognition of the numeral 0 that they should be considered in the recognition of this numeral to the exclusion of all other single matrix positions bits.

In order to obtain even greater discriminability in the recognition process, each matrix position 1 (black) bit and its complement or 0 (white) bit was combined in a logical OR circuit arrangement with every other matrix position 1 bit and its complement to determine those combinations which occurred in each of the 10,000 matrices C0, i.e., using conventional Boolean algebra nomenclature $A1+A2$, $A1+\overline{A2}$ . . . $\overline{G9}+\overline{G10}$ where the bar above the matrix position bit indicates the NOT 1, or 0 state. Then, the matrix position bits and complements were combined in exclusive OR combinations, i.e., $A1\overline{A2}+\overline{A1}A2$, $A1\overline{A3}+\overline{A1}A3$, etc., throughout the entire range of such combinations to determine those which occurred every time. Next, the negatives of these exclusive OR circuits were set up in logic form, i.e. $(\overline{A1}+A2)$ $(A1+\overline{A2})$, $(\overline{A1}+A3)$ $(A1+\overline{A3})$, etc., throughout the entire range of possible matrix combinations to determine those which occurred every time. Finally the bits were combined in the form e.g. $A1A2+\overline{A1A2}$ for all possible combinations to determine those which occurred every time.

Each of these matrix combinations, or logic circuits, was therefore checked individually against all of the 10,000 C0 printed matrices to determine which of these logic circuits occurred in each and every one of the 10,000 matrices for the numeral 0. The list of combination logic circuits, or partial statements, for the stylized character 0 which occurred in each printed matrix for the numeral 0, set forth in Chart No. 2. The probability of occurrence of these partial statements for a scanned numeral 0 cannot be said to be equal to probability 1 even though they occurred each and every time in 10,000 samples; however, it can be stated that the probability of occurrence is extremely close to 1 and that the probability of nonoccurrence is extremely close to 0, the exact values of the probabilities being unknown. It can be further stated that the probabilities of these combinations of bits are so pertinent to the recognition of a numeral 0 that they contribute reliably to the recognition of a matrix as a character 0 to the exclusion of all other combinations tested. Thus, only the individual and paired combinations of bits or partial statements in Chart No. 2 are used in the preferred embodiment for identifying an incoming matrix of a scanned character as the predetermined numeral 0 (C0). In one form of the preferred embodiment, the occurrence of one of these statements in the scanning of a character will result in a low current being applied to the current summation line C0; and its nonoccurrence in a large current being applied to the line C0. As will be seen later, it will be possible at times to neglect or omit the low currents.

It will be noted at this point that the stylized numeral 0 is generally rectangular in form except that the corners are rounded, and that the character is approximately equivalent in size to 7 matrix positions high and approximately 6 matrix positions wide.

The size and configuration of this character can be seen from an analysis of the partial statements of Chart No. 2. For example, the consistent occurrence of black or 1 bits in rows 4, 5, 6 and 7 of column G indicate the consistent alignment of the leading edge of the character with the column G and an approximate height of the leading edge of the character. None of the individual matrices in column F have a consistently black condition whereby it can be seen that the line width of the character impression is approximately one matrix position. The occurrence of consistently black or 1 bits in rows 5, 6 and 7 of columns A and B ORed together shows the approximate width of the character 0 as being approximately 6 matrix positions wide. The individual consistent black bits of row 9 in columns D and E indicate the aligned row position of the lower edge of the character. The existence of no consistent individual black or white bits in row 3 rather clearly illustrates the inconsistencies which are introduced by reason of character degradation in printing and noise in the system. The consistent occurrence of individual white or 0 bits in rows 5, 6 and 7 of columns C, D and E clearly illustrate the white central portion of the character.

This procedure of selecting partial statements is then duplicated for all other predetermined characters in the font with which scanned printed characters may be idenfied. The apparatus will therefore include one set of partial statement circuits for each character in the font. Further, since the exact values of the probabilities are not known but are known to be extremely close to 1, it will be appreciated that the resistance network connected to the outputs of the partial statement circuits can be simplified in the interest of economy by including resistors of equal high values and equal low values. Preferably, the resistors chosen have very narrow tolerance values in order to avoid accumulation of errors. Since there are only two resistance values, this selection can be made in an economical manner and will be discussed more fully with respect to the resistance network 59.

It will be seen below that at least one output of each partial statement circuit is connected to at least one of the current summation lines and on the other hand, the outputs of some of these statements will have connections to more than one of the current summation lines where the logic statement is pertinent to the identification of a scanned matrix with more than one of the predetermined set of characters.

More specifically, referring to FIG. 6, it will be seen that the partial statement circuits 58 include four bistable triggers 70, 71, 72 and 73 which are controlled by certain of the logic statements of Chart No. 2 which contribute reliably to the recognition of the above-said stylized numeral 0. Each trigger has a "0" and a "1" output. The "0" outputs 74, 75, 76 and 77 of the triggers 70–73 are energized when the triggers are in their reset state preparatory to reading of information from the register matrix 56 to the partial statement circuits. As a result, the "0" outputs of the triggers 70–73 normally apply a substantial current to the C0 current summation line by way of resistors 78, 79, 80 and 81; however, as will be apparent from the detailed description of FIG. 7, this will be of no consequence because the output from the probability resistance network 59 and the probability memory circuits 60 to the current differencing core array 61 will be rendered effective only at a predetermined time interval which will be set by a synchronizing pulse from the timing circuit 54.

An OR circuit 82 is connected to the input to the trigger 70 and two inputs, B5 and A5 from the register matrix to the OR circuit are provided. It will be noted that this is the first logical statement of Chart No. 2. An input G6 to the trigger 71 is provided and it will be noted that this is the first single bit partial statement of Chart No. 2. The input to the trigger 72 comprises a pair of AND circuits 83 and 84 ORed together by OR circuit 85, the output of which is connected to the input of the trigger 72. The AND circuit 83 is provided with two inputs B7 and B5 and the AND circuit 84 is provided with a pair of inputs $\overline{B7}$ and $\overline{B5}$. This input to trigger 72 is the first second level logical statement set forth in Chart No. 2. An OR circuit 115 having a pair of inputs $\overline{A9}$ and E3 supplies the input to the trigger 73 and it will be noted that this is the last logical statement set forth in Chart No. 2.

It will be apparent that there may be other resistors (not shown) connecting the "0" output of one or more of the triggers 70–73 to other current summation lines where the same partial statements are pertinent to the recognition of other characters. Occasionally, a partial statement for one character (e.g. G6) may be the negative or complement of a statement for another character (e.g. $\overline{G6}$), in which case the two statements may share the same trigger. The "0" output of the shared trigger will be connected through a resistor to the current summation line for the statement G6; the "1" output of the trigger will be connected through a resistor to the current summation line for the statement $\overline{G6}$; and only the G6 output of the register matrix will be connected to the trigger input. Circuit simplifications of this type are illustrated diagrammatically with respect to additional triggers 86 and 87. The trigger 86 has a single input 88 which corresponds to the 0 or 1 condition of one of the register matrix positions, and the trigger 87 has its input connected to the output of an exclusive OR circuit 89 which has paired inputs 90 and 91.

The "1" output of the trigger 86 is shown by way of example as being connected to the current summation lines C2 and C6 by resistors 92 and 93, and the "0" output of the trigger 86 is shown by way of example as being connected to the current summation lines C1 and C13 by resistors 94 and 95.

Similarly, the "1" output of the trigger 87 is shown connected to the current summation lines C4 and C6 by resistors 96 and 97; and the "0" output of the trigger 87 is shown connected to the current summation lines C3 and C7 by means of resistors 98 and 99.

It will be apparent from the preceding description that, when the triggers are in their "0" reset positions preparatory to the reading of a pattern stored in the register matrix, high currents will be applied by way of resistors such as 78, 79, 80, 81 and 92–99 to each current summation line. When the stored pattern is read out from its initial position in the register matrix, input signals will be applied to various triggers by way of the partial statements which are satisfied, thereby to cause the current applied to each of the current summation lines C0 to C13 to assume a lower value which corresponds to the probability that the stored pattern should be identified with the character corresponding to the current summation line. The lower the value of the current in the current summation line, the more probable the stored pattern corresponds to the respective character.

Resistors 101 to 114 connect the current summation lines C0 to C13, respectively, to a source of positive potential 116. Each of these resistors contributes to its respective current summation line the value of current which would have been supplied to that summation line by all of the high value resistances which have been removed from the circuit in accordance with the discussion set forth above. The selection of the values of these resistances and of those connected between the triggers and the current summation lines will now be described in more detail.

In the selection of the logical statements of the partial statement circuits 58, groups of 10,000 of each character C0 to C13 were selected and tested. It was also stated that the probability of occurrence of these statements is very close to 1 but cannot be said to be equal to 1. Since 10,000 printed characters were used it might be arbitrarily assumed that a probability of occurrence is close to .9999 and the probability of nonoccurrence of the complementary condition is close to .0001; or more conservatively it can be reliably stated that the probabilities of occurrence must certainly be at least .999 and the probabilities of nonoccurrence at least .001. Again since we are working with the addition of logarithms rather than the multiplication of probabilities, this will permit a resistance variation over a range of approximately 7500 to 1. That is, when the condition set forth by the statement is satisfied, one unit of current will be applied to the respective current summation line; and, when the condition is not satisfied, 7500 units of current will be applied to the current summation line. With such a wide variation in current contribution, it will be appreciated that the current which the resistors 101–114 contribute to their current summation lines is small in relation to the current contribution by any one of the small value resistances such as 78 connected to that line; and the resistors 101 to 114 can be neglected. Thus, satisfactory operation of the recognition equipment can be achieved by utilizing the resistors 101 to 114 or eliminating them, as desired. For a particular system working on a predetermined character font, the setting of the required reject and error rates may dictate the desirability of retaining these resistors.

As described above, the pattern stored in the register matrix will be read out sequentially from each of its 10 roll positions. Accordingly, the current output of each of the current summation lines will be characterized by a relatively high value positive polarity current which is reduced by an amount correspnding to the pertinent probabilities each time that the pattern is read out from the register matrix.

An illustration of a typical current output for one of the current summation lines and waveforms at various terminals in the probability memory circuits 60 are illustrated in FIG. 7 which will now be described in detail.

The probability memory circuits 60 store the signals from the probability resistance network current summation lines for each readout from the register matrix and must produce for each current summation line an output signal representative of the smallest signal produced by a readout from that current summation line and proportional to the value of said smallest signal.

One circuit for achieving this desired result is shown in FIG. 7 in the form of a delay line 120, the input of which is connected to the current summation line C0. The delay line 120 is provided with 10 taps, 121–1 to 121–10; and diodes 122–1 to 122–10 are connected to the taps. The anode terminals of the diodes are connected to a common input 123 of an amplifier 124. An additional diode 125 is connected to a source 126 of synchronizing pulses to the common input 123 of the amplifier.

The diodes 122–1 to 122–10 and diode 125 are poled so that the voltage appearing at the common input to the amplifier is equal to the most negative-going potential applied to the cathode terminals of the diodes, that is, the most negative potential appearing at the taps 121–1 to 121–10 and source 126. The signal input to the delay line 120 from the current summation line C0 is always a positive potential, and the potential applied to the terminal 126 is maintained at ground potential except when a positive-going synchronous pulse 127 is applied to the terminal.

The positive-going synchronous pulse applied to the terminal 126 is preferably at least as high as the maximum positive potential applied to the current summation line C0. This synchronous pulse is applied to the terminal 126 by the timing circuit 54 coincident with the application of the last pulse applied to the delay line 120 by the current summation C0, incident to a readout from the register matrix of the pattern stored therein in its last roll position. At this time, the ten negative going pulses produced by the readout of the pattern from the 10 roll positions are stored in succeeding portions of the delay line 120 so that each of these ten pulses is now applied to a respective tap 121–1 to 121–10. When the synchronous pulse 127 is applied, ground potential is removed from the common input 123 to the amplifier; and the least positive pulse (in the example shown, pulse 128) in the delay line circuit will cause a voltage 128*a* of similar amplitude to be applied through the respective diode to the common input to the amplifier 124. This positive voltage will cause the amplifier to produce an output pulse 128*b*. The amplifier, such as amplifier 124, for each current summation line is preferably a linear amplifier of predetermined characteristics so as not to disturb the amplitude relationships of the minimum currents in the various current summation lines of FIG. 6. For ease of illustration, the outputs from each of the amplifiers such as 124 will again be identified with the character to which they correspond. Thus the output of the amplifier 124 is identified with C0. It can be seen that a pulse is produced at the output C0 of the amplifier 124 only when a synchronizing pulse is applied to the terminal 126. The outputs of the amplifiers such as 124 for the current summation lines are applied to the current differencing core array.

The current differencing core array 61 will now be described in detail with respect to FIG. 8. The system illustrated diagrammatically in FIG. 4 has been described by way of example as having 14 different stylized characters C0 to C13 with which a scanned character pattern may be identified. The fragmentary schematic diagram of FIG. 8 illustrates the portion of the core array for the first three characters C0, C1 and C2 and the last character C13, the complete embodiment comprising a similarly connected 14 by 14 core matrix. This preferred form of a current differencing circuit is the subject matter of a copending application of Richard C. Lamy and Allan J. Atrubin, Serial No. 78,105 filed December 23, 1960; and said application is incorporated herein by reference as if it were set forth in its entirety. It will be appreciated that other known current differencing means may be utilized to achieve the results of the present invention.

Comparison of the values of the current outputs from the probability memory circuits 61 is accomplished by providing a plurality of signal comparing cells comprising bistable magnetic cores and arranged in a matrix of rows and columns. Each cell is adapted to compare two signals. There are provided as many rows and columns of cells as there are signals to be compared, that is, as many rows and columns as there are predetermined characters with which a scanned character may be identified. The output signal from each of the amplifiers such as amplifier 124 of the probability memory circuits 60 is applied as an input to the cells of one row and as an input to the cells of one column. The cells of a given column compare the signal associated with that column to the signals associated with each different row. Since in the example being described there are 14 characters with which a scanned character may be identified, the cells are arranged in 14 rows and 14 columns.

The one cell in each column which is also common to the row associated with the same input signal is not required in the comparison of input signals since its row and column inputs are identical. Accordingly, this common cell in each row and column is utilized for the second decision identified above which the recognition equipment must make, i.e. is the smallest current sufficiently small to warrant identification of the scanned character with the character corresponding to that signal. Accordingly, one of the inputs to each of these common cells is supplied by a standard source of predetermined current value for comparison with the column signal. The core array 61 includes input terminals C0, C1, C2 . . . C13 and cores 130–0 to 130–13, 131–0 to 131–13, 132–0 to 132–13 to 143–0 to 143–13. The input terminal C0 is connected to a circuit 150 which includes serially connected row input windings 170 and column input windings 171. Similarly, the input terminal C1 is connected to a circuit 151 which includes serially connected row input windings 173 and column input windings 174. The input terminal C2 is connected to a circuit 152 which includes serially connected row input windings 175 and column input windings 176. The input terminal C13 is connected to circuit 163 which includes serially connected row input windings 177 and column input windings 178. The comparing cells for each of the rows and columns not shown in FIG. 8 will have similar connections.

The row input windings 170, 173, 175 and 177 and the column input windings 171, 174, 176 and 178 are arranged such that the direction of the magnetic flux which they produce in the various magnetic cores will be of opposite polarity for the purpose of comparing the relative magnitudes of the row and column signals applied at inputs C0 to C13.

It will be recalled that the first decision to be made by the recognition equipment requires that the smallest current be smaller than the second smallest current by a predetermined amount to warrant identification of the smallest current with the corresponding character in the character font. To achieve this desired result in the core array 61, a source of bias signal is provided at 180. This bias source or drive is applied to serially connected bias windings 181 which are connected to each of the cores having both row and column input windings. The bias windings 181 and the bias drive 180 are arranged such that flux produced in each ferrite core is in the same direction as the flux produced in the cores by the column winding.

The arrangement of the standard pulse source 182 and the windings 183 is such that signals applied to the windings 183 produce flux in the respective magnetic cores which is in a direction opposite to the flux produced in those cores by the column input windings.

Each of the magnetic cores has associated therewith an output signal winding and the output signal windings of the cores in each column are serially connected and provide an input to an amplifier associated with that column. Thus the cores in the columns from left to right include output windings 190–0, 190–1, 190–2 . . . 190–13. The serially connected windings 190–0 are connected to the input of an amplifier 191–0, the windings 190–1 being connected to the input of an amplifier 191–1, the windings 190–2 being connected to the input of an amplifier 191–2, and the output windings 190–13 being connected to the input of an amplifier 191–13.

The outputs of the amplifiers 191–0 to 191–13 are connected to respective inputs of two-input AND circuits 192–0 to 192–13. A gate circuit 193 is connected to the other inputs of these AND circuits.

Each row of the core array 61 is provided with a read drive. Thus read drives 194–0 to 194–13 are provided for the core array. The output of each read drive is connected to serially connected read windings of each of the cores in the corresponding row. Thus the read drives 194–0, 194–1, 194–2 . . . 194–13 are connected to windings 195–0, 195–1, 195–2 . . . 195–13. The operation of the current differencing core array 61 to achieve the two decisions which are required for character identification will now be described in greater detail.

The bistable magnetic cores have a hysteresis loop with two distinctly different stable states of magnetic remanence. These stable states are identified by the numerals 1 and 0 in accordance with customary binary terminology and hereinafter they will be referred to as "1 state" and the "0 state." For purposes of the following description the 0 state will be considered as the reset or cleared state.

The magnetic state of a bistable core may be altered by the application of a magnetic force thereto by means of a current-carrying winding coupled to the core. The magnetic force may exist in either of two opposite directions along the H axis of the hysteresis loop. A force of sufficient magnitude in one direction will drive the core to a positive saturation condition, and a force of sufficient magnitude in the opposite direction will drive the core to negative magnetic saturation. The core will remain in a saturated condition only so long as the force exists, however, and when the force is removed the core will traverse its hysteresis loop to the nearest remanence state; the 1 state if driven to positive saturation or the 0 state if driven to negative saturation.

Current in the row input, read and standard pulse windings tend to drive the associated core from the 1 state to the 0 state, and current flowing in the column input and bias windings tend to drive the associated core from the 0 state to the 1 state. The magnetic cores are not necessarily of the so-called "square loop" type, i.e., they need not have well-defined switching thresholds as is the case with conventional memory cores. The cores are selected so that the smallest signal difference to be detected will create a magnetic force sufficient to switch a core from one stable state to the other.

At the end of a complete roll of a scanned character through the register matrix, signals will be applied simultaneously from the probability memory circuit 60 to the inputs C0 to C13 of the core array 61. These signals will be applied simultaneously to the respective row and column windings. Coincident with the application of these pulses to the row and column windings, the timing circuit 54 will cause the bias drive 180 to apply signals to the bias windings 181 and to the standard pulse windings 183.

Those cores in which the column input winding current and the bias current exceed the row input winding current will switch from their 0 reset states to the 1 state; and where the bias current and the column current do not exceed the row current, the core will be retained in its 0 state.

Those cores in which the column current exceeds the standard pulse source current will be switched from their 0 to their 1 states; and when the column current does not exceed the standard current, the core will be retained in its 0 reset state.

Thus at the termination of the row, column, bias and standard input currents, the magnetic cores in the array will be variously set in their 0 or 1 states depending upon the relative values of these currents. A short time interval after this, the timing circuit 54 causes the read drives 194–0 to 194–13 to apply pulses to their respective windings in sequence. These pulses will cause the ferrite cores which are in the 1 states to be reset to their 0 states; and, in being reset to their 0 states, the respective output windings of these cores have a voltage induced therein. The output windings of those cores which remained in their 0 states will not have a voltage induced therein upon the application of the read drive pulse.

The relative magnitudes of the input signals applied to the terminals C0 to C13 will now be considered in terms of their effect upon the setting of the cores in their respective columns. Assume that the smallest magnitude current is applied to the input terminal C0; and assume further that this current is sufficiently smaller in magnitude than the current supplied to the other input terminals to warrant recognition, i.e., it is smaller than the next smallest signal by a value at least equal to the bias current. This smallest signal applied to the input terminal C0 is applied to the column windings 171. This column current and the bias current are sufficiently low with respect to the magnitude of the row current applied to the magnetic cores 131–0, 132–0 . . . 143–0 so that all of these cores will remain in their 0 states.

Assume further that this smallest current is equal to or smaller than the standard pulse source current applied to the core 130–0, whereby this core will also be retained in to 0 state. Since all of the cores in the left-hand column associated with the input signals C0 are retained in their 0 states, the subsequent application of the read drive pulses to the various read windings will result in no output pulse being induced in any of the output windings 190–0. As a result, no pulse will be applied to the amplifier 191–0.

This condition whereby no pulse is applied to the amplifier 191–0, is indicative of the satisfaction of both decisions which must be made by the recognition equipment to warrant the identification of a scanned character with one of the characters in the predetermined character font. Since this current applied to the input terminal C0 is less than the current supplied to the other input terminals all of the magnetic cores 130–1 to 130–13 will be switched from their 0 states to their 1 states. As a result, when the read drive 194–0 applies the read pulse to these cores 130–1 to 130–13, an output signal will be induced in the uppermost windings 190–1 to 190–13 to apply input pulses to the amplifiers 191–1 to 191–13.

Prior to the initiation of the read pulses by the timing circuit 54, the timing circuit will apply a gate pulse to the gate circuit 193 and this pulse will be applied until the end of the read drive pulsing. Therefore, when input pulses are applied to the amplifiers 191–1 to 191–13, the amplifiers wil cause pulses to be applied to the inputs of the AND circuits 192–1 to 192–13; and the AND circuits 192–1 to 192–13 will produce output pulses.

The outputs of the AND circuits 192–0 to 192–13 are connected to the character register 62. The character register 62 comprises a plurality of bistable triggers 200–0 to 200–13, one trigger being provided for each of the AND circuits. Since each AND circuit is associated with a particular column in the core array and since each column is associated with a respective character with which the scanned character may be identified, each of the triggers 200–1 to 200–13 is therefore associated with one of the characters with which the scanned character may be identified.

The triggers 200–0 to 200–13 are normally set in their ON states; and, whenever the corresponding AND circuit connected to the input of the trigger applies a pulse to the trigger, it is turned OFF. Thus in the example described above with respect to the core array 61, the trigger 200–0 will be retained in its ON state and the triggers 200–1 to 200–13 will be switched to their OFF states.

The output of the trigger 200–0 may be utilized in any well-known manner by the utilization device shown diagrammatically at 65 in FIG. 4.

In the event that both of the decisions required for character identification were not satisfied, it can be appreciated that all of the triggers 200–0 to 200–13 will be switched to their OFF condition. Also faulty operation of the core array 61 could result in a condition in which two or more of the triggers might be retained in their ON conditions. In either event the checking circuit 63 will give an indication of an error or a reject substantially as described in the above-said Eckelman et al. application.

Briefly, a multilevel logical circuit controlled by the timing circuit 54 and having inputs connected to the ON sides of the triggers is provided, which circuit will produce a pulse at one output if 0 or more than 1 triggers are in their ON conditions and will produce an output pulse at another terminal in the event that one and only one trigger is retained in its ON condition. It will be appreciated, however, that other well-known checking circuits may be utilized for this purpose, for example, a set of conventional exclusive OR circuits connected to the ON side outputs of the triggers.

At the end of a recognition cycle, the timing circuits 54 will apply a pulse to the reset circuit 201 to reset all of the registers 200–0 to 200–13 to their ON states.

The timing control circuit 53 and the timing circuit 54 preferably control the operation of the quantizing circuits 52, the buffer triggers 55, the register matrix 56, the checking circuit 63 and the character register 62 substantially as described in the above-said Eckelman et al. application. However, any known means such as triggers and ring circuits for producing trains of properly timed pulses may be used. In addition, the timing circuit 54 will include convention means (not shown) for producing a properly timed sequence of pulses to initiate the following operations in the order set forth: (1) readout of the minimum signals from the probability memory circuits 60 into the core array 61 coincident with the application of the bias and standard signals to the core array; (2) sequential application of the read pulses to succeeding rows of cells in the core array coincident with the application of gate pulse to the AND circuits 192–0 to 192–13; and (3) resetting of the triggers in the character register 62 to their ON states by a reset pulse after recognition of a scanned pattern is achieved.

A brief description of the operation of the apparatus to recognize one printed character will now be made. The sensing device 45 senses the leading edge of the document 40 and conditions the circuits for the recognition of a character pattern 42 on the document. The generator 48 magnetizes in character pattern as it passes. Subsequently, when the read heads 46 sense at least two black bits of the leading edge of the character pattern, at least two of the quantizing circuit channels 52 will be turned on to produce a signal which causes the timing control circuit 53 to actuate the timing circuit 54 to initiate the recognition cycle.

The timing circuit 54 controls the transfer of the signal bits corresponding to the pattern from the quantizing circuits 52 and the buffer triggers 55 to the register matrix 56 with the leading edge of the character being positioned in the column G of the matrix. The timing circuit 54 will produce a first readout pulse to transfer the matrix bits to the partial statement circuits 58 and the probability resistance network 59.

Immediately thereafter, the timing circuit 54 will cause the pattern in the register matrix 56 to be rolled one position vertically. The timing circuit will then initiate a second readout of the matrix bits from this second matrix position into the partial statement circuits and the probability resistance network. The pattern will be rolled in the register matrix until it has assumed the ten possible positions in the matrix; and, in each position, the matrix bits will be applied to the partial statements and probability resistance network.

The probability memory circuits 60 will have stored therein the signals formed by the probability resistance network in response to the matrix bit readouts into the partial statement circuits. The timing circuit 54 applies a sychronizing pulse 127 to the probability memory circuits to transfer the lowest signal from each current summing line C0 to 13 of the probability resistance network into the current differencing core array 61 for recognition of the pattern scanned. Under the control of timing circuit, the core array compares the magnitudes of the input signals with each other and with a standard signal to determine the predetermined character with which the pattern is to be identified. The core array produces output signals which turn off all triggers in the character register 62 except the trigger corresponding to the identified character.

Thus in the event of recognition of a character, all of the triggers except the trigger corresponding to that character will be turned off. In the event that both decisions required for the recognition of a pattern were not satisfied, all of the triggers in the character register 62 will be turned off. In this event, the checking circuit 63 produces a signal indicating nonrecognition of the scanned character pattern; and the timing circuit 54 produces a reject signal in response to the checking circuit signal.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Pattern recognition apparatus comprising
means for scanning an unknown pattern which is to be recognized and producing output signals in response to said scanning,
means responsive to a succession of incremental portions of said signals for establishing conditions representing both the occupancy and nonoccupancy of matrix areas by the unknown pattern, and
means conditioned in accordance with the probabilities of various of said occupancy and nonoccupancy conditions existing upon the scanning of each of a group of predetermined patterns,
said conditioned means being responsive to said established conditions for signalling which of said predetermined patterns is most probably represented by established conditions resulting upon the scanning of a said unknown pattern.

2. Character recognition apparatus comprising
means for scanning an unknown character which is to be recognized and producing output signals in response to said scanning,
means responsive to a succession of incremental portions of said signals for establishing conditions representing both the occupancy and nonoccupancy of matrix areas by the unknown character, and
means conditioned in accordance with a function of the product of the probabilities of various of said occupancy and nonoccupancy conditions existing upon the scanning of each of a group of predetermined characters,
said conditioned means being responsive to said established conditions for signalling which of said predetermined characters is most probably represented by established conditions resulting upon the scanning of said unknown character.

3. Character recognition apparatus comprising
means for scanning an unknown character which is to be recognized and producing output signals in response to said scanning, means responsive to a succession of incremental portions of said signals for establishing conditions representing both the occupancy and nonoccupancy of matrix areas by the unknown character, and
means conditioned in accordance with the sum of the logarithms of the probabilities of various of said occupancy and nonoccupancy conditions existing upon the scanning of each of a group of predetermined characters,
said conditioned means being responsive to said established conditions for signalling which of said predetermined characters is most probably represented by established conditions resulting upon the scanning of said unknown character.

4. The combination set forth in claim 3 in which the conditioned means includes
an impedance network for each predetermined character, the magnitude of each impedance being inversely proportional to the logarithm of the probability of one of said occupancy and nonoccupancy conditions existing upon the scanning of the respective predetermined character.

5. Apparatus for identifying a pattern comprising
scanning means for detecting portions of the pattern that occupy portions of a matrix of areas that together encompass the pattern,
a register matrix,
means responsive to the scanning means for setting the register matrix in accordance with the occupancy and nonoccupancy of the matrix of areas, and
means including a plurality of impedance networks, each conditioned in accordance with the probabilities of occupancy and nonoccupancy of the matrix areas by patterns produced upon the selection of a predetermined one of a set of patterns responsive to both the occupancy and nonoccupancy settings of the register matrix and producing a plurality of electrical signals, the value of each of said signals corresponding to the probability that the scanned pattern will occur upon the original selection of a respective one of the predetermined set of patterns.

6. Apparatus for identifying a pattern comprising
scanning means for detecting portions of the pattern that occupy portions of a matrix of areas that together encompass the pattern,
a register matrix,
means responsive to the scanning means for setting the register matrix in accordance with the occupancy and nonoccupancy of the matrix of areas, corresponding to the detected portions of the pattern in the register matrix,
means including a plurality of impedance networks, each conditioned in accordance with the probabilities of occupancy and nonoccupancy of the matrix areas by patterns produced upon the selection of a predetermined one of a set of patterns responsive to both the occupancy and nonoccupancy settings of the register matrix and producing a plurality of electrical signals, the value of each of said signals corresponding to the probability that the scanned pattern will occur upon the original selection of a respective one of the predetermined set of patterns, and
means responsive to the signals for identifying the scanned pattern with the predetermined pattern it most probably represents.

7. Apparatus for classifying an unknown pattern marked on a record with one of a set of predetermined patterns comprising:
means for scanning the marking conditions of a matrix of areas that together encompass said unknown pattern,
a two-dimensional register matrix,
means responsive to the scanning means for storing the marking conditions of the scanned matrix of areas in the register matrix, a set of partial statement logic circuits for each predetermined pattern selectively energized by the register matrix in accordance with the marking conditions stored in the matrix, each partial statement having an occurrence probability very close to 1 upon scanning of an unknown pattern originally selected as the predetermined pattern corresponding to the partial statement, means connected to the sets of partial statement logic circuits producing a signal for each set, the magnitude of which is an inverse function of the occurrence of the statements in the set upon energization of the logic circuits by the register matrix, and means comparing the magnitudes of the signals corresponding to each set with each other for identification of the unknown pattern with the predetermined pattern corresponding to the lowest magnitude signal when the magnitude of said latter signal is a predetermined amount less than the next smallest signal.

8. Apparatus for classifying an unknown pattern marked on a record with one of a set of predetermined patterns comprising:

means for scanning the marking conditions of a matrix of areas that together encompass said unknown pattern, a two-dimensional register matrix, means responsive to the scanning means for storing the marking conditions of the scanned matrix of areas in the register matrix, a set of partial statement logic circuits for each predetermined pattern selectively energized by the register matrix in accordance with the marking conditions stored in the matrix, each partial statement having an occurrence probability very close to 1 upon scanning of an unknown pattern originally selected as the predetermined pattern corresponding to the partial statement, means connected to the sets of partial statement logic circuits producing a probability signal for each set, the magnitude of which is an inverse function of the occurrence of the statements in the set upon energization of the logic circuits by the register matrix, means for producing a standard signal of predetermined low magnitude, and means comparing the magnitudes of the probability signals corresponding to each set with each other and with the magnitude of the standard signal for identification of the unknown pattern with the predetermined pattern corresponding to the lowest magnitude probability signal when the magnitude of said latter signal is less than the magnitude of the standard signal and is a predetermined amount less than the magnitude of the next smallest probability signal.

9. Apparatus for identifying an unknown pattern with one of a predetermined set of patterns comprising scanning means for detecting portions of the unknown pattern that occupy portions of a matrix of areas that together encompass the unknown pattern, a multiposition register matrix, means responsive to the scanning means for setting the register matrix in accordance with the occupancy and nonoccupancy of the matrix of areas, an impedance network for each predetermined pattern, the magnitudes of the impedances being a function of the occupancy and nonoccupancy probabilities of respective register matrix positions and combinations of positions by the respective predetermined patterns, means energizing each impedance network in accordance with the register matrix setting to produce a signal the magnitude of which is a function of the probability that the unknown pattern is the respective predetermined pattern, and means responsive to the signals for identifying the unknown pattern with the predetermined pattern it most probably represents.

10. Apparatus for identifying an uknown pattern with one of a predetermined set of patterns comprising scanning means for detecting portions of the unknown pattern that occupy portions of a matrix of areas that together encompass the unknown pattern, a multiposition register matrix, means responsive to the scanning means for setting the register matrix in accordance with the occupancy and nonoccupancy of the matrix of areas, an impedance network for each predetermined pattern, the magnitudes of the impedances being an inverse function of the logarithms of the occupancy and nonoccupancy probabilities or respective register matrix positions and combinations of positions by the respective predetermined patterns, means energizing the impedances of each impedance network in parallel in accordance with the register matrix setting to produce a sum signal the magnitude of which is proportional to the logarithm of the probability that the unknown pattern is the respective predetermined pattern, and means responsive to the signals for identifying the unknown pattern with the predetermined pattern it most probably represents.

11. Pattern recognition apparatus comprising means for scanning an unknown pattern which is to be recognized and producing output signals in response to said scanning, means responsive to a succession of incremental portions of said signals for establishing conditions representing the unknown pattern, an impedance network for each one of a set of predetermined patterns with which the unknown pattern may be identified, the magnitudes of the impedances being a function of the occurrence and nonoccurrence probabilities of respective ones of said established conditions upon scanning of the respective predetermined patterns, means energizing each impedance network in accordance with the established conditions to produce a signal the magnitude of which is a function of the probability that the unknown pattern is the respective predetermined pattern, and means responsive to the signals for identifying the unknown pattern with the predetermined pattern it most probably represents.

12. Pattern recognition apparatus comprising means for scanning an unknown pattern which is to be recognized and producing output signals in response to said scanning, means responsive to a succession of incremental portions of said signals for establishing conditions representing the unknown pattern, an impedance network for each one of a set of predetermined patterns with which the unknown pattern may be identified, the magnitudes of the impedances being an inverse function of the logarithms of the occurrence and nonoccurrence probabilities of respective ones of said established conditions upon scanning of the respective predetermined patterns, means energizing each impedance network in accordance with the established conditions to produce a signal the magnitude of which is proportional to the logarithm of the probability that the unknown pattern is the respective predetermined pattern, and means responsive to the signals for identifying the unknown pattern with the predetermined pattern it most probably represents.

13. Apparatus for identifying an unknown pattern with one of a predetermined set of patterns comprising scanning means for detecting portions of the unknown pattern that occupy portions of a matrix of areas that together encompass the unknown pattern, a multiposition register matrix, means responsive to the scanning means for setting the register matrix in accordance with the occupancy and nonoccupancy of the matrix of areas, an impedance network for each predetermined pattern, the magnitudes of the impedances being an inverse function of the logarithms of the occupancy and nonoccupancy probabilities of respective register matrix positions and combinations of positions by the respective predetermined patterns, means energizing each impedance network in accordance with the register matrix setting to produce a probability signal the magnitude of which is proportional to the logarithm of the probability that the unknown pattern is the respective predetermined pattern, means for producing a standard signal of predetermined low magnitude, and means comparing the magnitudes of the probability signals with each other and with the standard signal for identification of the unknown pattern with the predetermined pattern corresponding to the lowest magnitude probability signal when the magnitude of the latter signal is less than the standard signal and is a predetermined amount less than the next smallest probability signal.

14. Apparatus for classifying an unknown pattern contained on a record with one of a set of predetermined patterns comprising:

scanning means for detecting portions of the unknown pattern that occupy portions of a matrix of areas that together encompass said unknown pattern, a two-dimensional register matrix having matrix position outputs, means responsive to the scanning means for storing the unknown pattern portions in the register matrix, a set of partial statement logic circuits for each predetermined pattern having outputs and having inputs selectively connected to predetermined matrix position outputs, each partial statement having an occurrence probability very close to 1 upon scanning of an unknown character originally selected as the predetermined pattern corresponding to the partial statement, a current summation line for each set of partial statement logic circuits, a resistor connected between each partial statement logic circuit output and its corresponding current summation line and energized by the logic circuit when the pattern stored in the matrix does not satisfy the partial statement and deenergized when the pattern stored in the matrix satisfies the partial statement, means connected to the current summation lines for comparing the relative values of currents in the resistors connected to respective current summation lines and for identifying the unknown character with the predetermined pattern corresponding to the current summation line having the lowest value current therein when said lowest value current is at least a predetermined value less the currents in other summation lines.

15. Apparatus for identifying an unknown pattern with one of a predetermined set of patterns comprising scanning means for detecting portions of the unknown pattern that occuy portions of a matrix of areas that together encompass the unknown pattern, a multiposition register matrix having occupancy and nonoccupancy outputs, means responsive to the scanning means for setting the register matrix in accordance with the occupancy and nonoccupancy of the matrix of areas, an impedance network for each predetermined pattern, the magnitudes of the impedances in each network being proportional to the reciprocals of the logarithms of the occupancy and nonoccupancy probabilities of respective register matrix positions by the respective predetermined pattern, the impedances corresponding to occupancy and nonoccupancy probabilities being connected at one end to respective occupancy and nonoccupancy outputs of the register matrix, a current summing line for each predetermined pattern connected to one end of each impedance in the respective network, means energizing the impedances of each network by way of the register matrix outputs in accordance with the register matrix setting to produce on the respective current summing line a signal the magnitude of which is proportional to the sum of the logarithms of the occupancy and nonoccupancy probabilities corresponding to the energized impedances, and means responsive to the signals on the current summing lines for identifying the unknown pattern with the predetermined pattern corresponding to the summing line having the lowest value signal.

16. The apparatus as set forth in claim 15 wherein there are provided in the impedance networks only those impedances which correspond to probability values very close to 1 and 0.

17. The apparatus set forth in claim 15 wherein the last mentioned means comprises means for producing a standard signal of predetermined low magnitude, and means comparing the magnitudes of the signals on the current summing lines with each other and with the standard signal for identification of the unknown pattern with the predetermined pattern corresponding to the lowest magnitude signal on a current summing line when the magnitude of the latter signal is less than the standard signal and is a predetermined amount less than the next smallest signal on a current summing line.

18. The apparatus set forth in claim 15 wherein the impedances of each network are arranged in pairs corresponding to the occupancy and nonoccupancy probabilities of a respective register matrix position by the respective predetermined pattern, each impedance which is significantly larger in value than the other in a respective pair being combined with other similarly high value impedances in other pairs of the same network in a continuously energized equivalent impedance, the lower value impedances in the pairs having their values adjusted to compensate for the continuous current contribution by the equivalent impedances.

19. In a system for identifying an unknown character with one of a predetermined set of characters $C_i$ having means for scanning the unknown character and producing signals quantized in time and amplitude in accordance with the character scanned and having a two-dimensional register matrix for storing said signals in a pattern $M_k$ corresponding to the unknown character where $M_k$ consists of a number of binary digits $d_{rc}{}^k$ each either 0 or 1, means controlled in accordance wtih the matrix pattern $M_k$ geenrating, for each character in the set, signals which are a function of $$\underset{r,c}{\pi} P[(d_{rc}=d_{rc}{}^k)/C_i]$$

means for producing a fixed signal the value of which is a function of a selected constant "$a$" which is less than 1, means for comparing at least the signals corresponding to $$\underset{i}{\max.} \underset{r,c}{\pi} P[(d_{rc}=d_{rc}{}^k)/C_i] \text{ and}$$

$$2 \underset{i}{\max.} \underset{r,c}{\pi} P[(d_{rc}=d_{rc}{}^k)/C_i]$$

with the fixed signal and for identifying the unknown character with the character corresponding to the signal $$\max_{i} \prod_{r,c} P[(d_{rc}=d_{rc}^{k})/C_i]$$

when $$\frac{2 \max_{i} \prod_{r,c} P[(d_{rc}=d_{rc}^{k})/C_i]}{\max_{i} \prod_{r,c} P[(d_{rc}=d_{rc}^{k})/C_i]} < \frac{1-a}{a}$$

20. In a system for identifying an unknown character with one of a predetermined set of characters $C_i$ having means for scanning the unknown character and producing signals quantized in time and amplitude in accordance with the character scanned and having a two-dimensional register matrix for storing said signals in a pattern $M_k$ corresponding to the unknown character where $M_k$ consists of a number of binary digits $d_{rc}^{k}$ each either 0 or 1, means controlled in accordance with the matrix pattern $M_k$ generating, for each character in the set, signals which are a function of $$\prod_{r,c} P[(d_{rc}=d_{rc}^{k})/C_i]$$

means for producing a fixed signal the value of which is a function of a selected constant "$a$" which is less than 1, means for comparing at least the signals corresponding to $$\max_{i} \prod_{r,c} P[(d_{rc}=d_{rc}^{k})/C_i] \text{ and}$$

$$2 \max_{i} \prod_{r,c} P[(d_{rc}=d_{rc}^{k})/C_i]$$

with the fixed signal and for partially identifying the unknown character with the character corresponding to the signal $$\max_{i} \prod_{r,c} P[(d_{rc}=d_{rc}^{k})/C_i]$$

when $$\frac{2 \max_{i} \prod_{r,c} P[(d_{rc}=d_{rc}^{k})/C_i]}{\max_{i} \prod_{r,c} P[(d_{rc}=d_{rc}^{k})/C_i]} < \frac{1-a}{a}$$

means for producing a second fixed signal the value of which is a function of a selected constant "$e$," and means for comparing the signal $$\max_{i} \prod_{r,c} P[(d_{rc}=d_{rc}^{k})/C_i]$$

with the second fixed signal and for partially identifying the unknown character with the character corresponding to the signal $$\max_{i} \prod_{r,c} P[(d_{rc}=d_{rc}^{k})/C_i]$$

when $$\max_{i} \prod_{r,c} P[(d_{rc}=d_{rc}^{k})/C_i] > e$$

References Cited by the Examiner

UNITED STATES PATENTS 2,978,675 4/1961 Highleyman ---------- 340—149

ROBERT C. BAILEY, *Primary Examiner.*

MALCOLM A. MORRISON, *Examiner.*